US010769838B2

(12) United States Patent
Heggelund et al.

(10) Patent No.: US 10,769,838 B2
(45) Date of Patent: Sep. 8, 2020

(54) HIERARCHICAL GRAPHICS PROCESSING FOR PRIMITIVES

(71) Applicant: Arm Limited, Cambridge (GB)

(72) Inventors: Frode Heggelund, Trondheim (NO); Toni Viki Brkic, Staffanstorp (SE); Christian Vik Grovdal, Trondheim (NO); Lars Oskar Flordal, Uppsala (SE)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/218,982

(22) Filed: Dec. 13, 2018

(65) Prior Publication Data

US 2019/0188896 A1 Jun. 20, 2019

(30) Foreign Application Priority Data

Dec. 18, 2017 (GB) .................................. 1721202.8

(51) Int. Cl.
*G06T 15/00* (2011.01)
*G06T 1/20* (2006.01)
(Continued)

(52) U.S. Cl.
CPC .............. *G06T 15/005* (2013.01); *G06T 1/20* (2013.01); *G06T 11/40* (2013.01); *G06T 15/80* (2013.01)

(58) Field of Classification Search
CPC .......... G06T 15/005; G06T 1/20; G06T 15/80
See application file for complete search history.

(56) References Cited

U.S. PATENT DOCUMENTS 6,259,452 B1 7/2001 Coorg
6,525,726 B1 2/2003 Xie
(Continued)

FOREIGN PATENT DOCUMENTS

EP 1918878 5/2008
GB 2496716 5/2013
(Continued)

OTHER PUBLICATIONS

GB Combined Search and Examination Report dated Jun. 18, 2018, GB Patent Application No. GB1721202.8.
(Continued)

*Primary Examiner* — Terrell M Robinson
(74) *Attorney, Agent, or Firm* — Vierra Magen Marcus LLP

(57) ABSTRACT

A graphics processing system can divide a render output into plural larger patches, with each larger patch encompassing plural smaller patches. A rasteriser of the system tests a larger patch against a primitive to be processed to determine if the primitive covers the larger patch. When it is determined that the primitive only partially covers the larger patch, the larger patch is sub-divided into plural smaller patches and at least one of the smaller patches is re-tested against the primitive. Conversely, when it is determined that the primitive completely covers the larger patch, the larger patch is output from the rasteriser in respect of the primitive for processing by a subsequent stage, of the graphics processing system. The system can provide efficient, hierarchal, processing of primitives, whilst helping to prevent the output of the rasteriser from becoming blocked.

18 Claims, 6 Drawing Sheets

(51) Int. Cl.
*G06T 15/80* (2011.01)
*G06T 11/40* (2006.01)

(56) References Cited

U.S. PATENT DOCUMENTS

| | | | |
|---|---|---|---|
| 6,636,232 B2 | 10/2003 | Larson | |
| 6,646,639 B1 | 11/2003 | Greene | |
| 6,801,215 B1* | 10/2004 | Silva | G06T 15/40 |
| | | | 345/629 |
| 7,027,047 B2 | 4/2006 | Kim | |
| 7,068,272 B1 | 6/2006 | Voorhies | |
| 7,119,809 B1 | 10/2006 | McCabe | |
| 8,081,184 B1 | 12/2011 | Nordquist | |
| 8,130,222 B1 | 3/2012 | Urry | |
| 8,854,364 B1 | 10/2014 | Voorhies | |
| 9,098,943 B1 | 8/2015 | Baldwin | |
| 9,153,070 B2 | 10/2015 | Nystad | |
| 9,214,006 B2 | 12/2015 | Heggelund | |
| 9,519,982 B2 | 12/2016 | Heggelund | |
| 9,558,585 B2 | 1/2017 | Nystad | |
| 10,043,306 B2 | 8/2018 | Isomaki | |
| 2001/0055015 A1 | 12/2001 | Iourcha | |
| 2004/0119710 A1 | 6/2004 | Piazza | |
| 2004/0246251 A1 | 12/2004 | Fenney | |
| 2006/0139366 A1 | 6/2006 | Piazza | |
| 2008/0068375 A1 | 3/2008 | Min | |
| 2008/0117221 A1 | 5/2008 | Hitchins | |
| 2010/0007662 A1 | 1/2010 | Cox | |
| 2011/0234609 A1* | 9/2011 | Cai | G06T 11/40 |
| | | | 345/581 |
| 2012/0268465 A1 | 10/2012 | Inada | |
| 2012/0293515 A1 | 11/2012 | Clarberg | |
| 2013/0076762 A1 | 3/2013 | Heggelund | |
| 2013/0120380 A1* | 5/2013 | Kallio | G06T 15/005 |
| | | | 345/421 |
| 2013/0141445 A1 | 6/2013 | Eng-Halstvedt | |
| 2013/0241938 A1 | 9/2013 | Gruber | |
| 2013/0342547 A1 | 12/2013 | Lum | |
| 2014/0085300 A1 | 3/2014 | Andersson | |
| 2014/0267258 A1 | 9/2014 | Yang | |
| 2014/0354670 A1* | 12/2014 | Heggelund | G06T 11/40 |
| | | | 345/589 |
| 2015/0022519 A1 | 1/2015 | Lum | |
| 2015/0049104 A1* | 2/2015 | Lum | G06T 15/04 |
| | | | 345/552 |
| 2015/0269771 A1 | 9/2015 | Hasselgren | |
| 2017/0024927 A1* | 1/2017 | Isomaki | G06T 15/005 |
| 2017/0309027 A1* | 10/2017 | Kleen | G06T 15/005 |
| 2017/0372509 A1* | 12/2017 | Paltashev | G06T 15/405 |
| 2018/0165872 A1* | 6/2018 | Lefebvre | G06T 15/005 |
| 2019/0066356 A1* | 2/2019 | Gierach | G06T 1/20 |

FOREIGN PATENT DOCUMENTS

| | | |
|---|---|---|
| GB | 2510964 | 8/2014 |
| GB | 2517032 | 2/2015 |
| GB | 2517033 | 2/2015 |

OTHER PUBLICATIONS

Combined Search and Examination Report dated Jun. 19, 2014, in Great Britain Patent Application No. GB1322284.9, 5 pages.
Aila, et al., "Delay Streams for Graphics Hardware," 2003.
Out-of-order execution, Wikipedia, Dec. 9, 2013, 4 pgs., Available at http://en.wikipedia.org/wiki/Out-of-order_execution.
Slipstream (computer science), Wikipedia, Dec. 9, 2013, 1 pg., Available at http://en.wikipedia.org/wiki/Slipstream_(computer_science).
Speculative execution, Wikipedia, Dec. 9, 2013, 3 pgs., Available at http://en.wikipedia.org/wiki/Speculative_execution.
Examination Report dated Mar. 2, 2016 in GB Patent Application No. GB1409585.5.
Early Fragment Test, by Open GL.org, Jul. 27, 2013, Available at: http://www.opengl.org/wiki/Early_Depth_Test.
Hidden Surface Removal—12a (Visible Surface determination), 24 pp., Apr. 20, 2009, University of Bath, Department of Computer Science, Bath, UK, Available at: http://www.cs.bath.ac.uk/~djp/30075-CG-12a-hiddenSurfaces.ppt.
Visible Surface Algorithms, Chapter 7, pp. 264-293, Oct. 15, 2005, 2009 Nanjing University of Aeronautics Aeronautical Engineering Experimental Teaching Center, Available at: http://gc.nuaa.edu.cn/hangkong/zjj/cad2/Computer%20graphics%20and%20geometric%20modeling%20implementation%20and%20algorithms/7.pdf.
Combined Search and Examination Report in GB Patent Application No. GB1322278.1 dated Jun. 19, 2014, 5 pages.
Combined Search and Examination Report dated Dec. 9, 2014 in GB Patent Application No. GB1409584.8, 4 pages.
Digital Differential Analyzer (graphics algorithm), Jan. 10, 2013, Available at: http://en.wikipedia.org/wiki/Digital_differential_Analyzer_(graphics_algorithm), 2 pages.
Examination Report dated Mar. 2, 2016 in GB Patent Application No. GB1409584.8.
Greene, Hierarchical Polygon Tiling with Coverage Masks, 1996, 12 pages.
Warnock, A Hidden Surface Algorithm for Computer Generated Halftone Pictures, Jun. 1969, 35 pages, National Technical Information Service, U.S. Department of Commerce.
GB Combined Search and Examination Report, dated Dec. 10, 2015, GB Patent Application GB1510866.5.
Bittner et al., Hierarchical Visibility Culling with occlusion Trees, 1998, IEEE Computer Graphics International, pp. 207-219.

* cited by examiner

HIERARCHICAL GRAPHICS PROCESSING FOR PRIMITIVES

BACKGROUND

The technology described herein relates to computer graphics processing, and in particular to processing graphics primitives to generate a render output in a computer graphics processing system.

Graphics processing is normally carried out by first splitting the desired render output, e.g. the frame to be displayed, into a number of similar basic components or "primitives", which primitives are then subjected to the desired graphics processing operations. The graphics primitives are usually in the form of simple polygons, such as triangles or quadrilaterals.

Each primitive is usually defined by and represented as a set of vertices. Each vertex for a primitive has associated with it a set of data (such as position, colour, texture and other attributes data) representing the vertex. This data is then used, e.g., when rasterising and rendering the primitive(s) to which the vertex relates, e.g. for display.

Once primitives and their vertices have been generated and defined, they can be processed by the graphics processing system, in order, e.g., to render the frame. This process basically involves determining which sampling positions of an array of sampling positions covering the output area to be processed are covered by a primitive, and then determining the appearance that each sampling point should have (e.g. in terms of its colour, etc.) to represent the primitive at that sampling position. These processes are commonly referred to as rasterising and rendering, respectively.

The rasterising process typically determines the sampling points that should be used for a primitive (i.e. the (x, y) sampling positions for sampling points to be used to represent the primitive in the render output, e.g. frame to be displayed).

The rendering process then derives the data, such as red, green and blue (RGB) colour values and an "Alpha" (transparency) value, necessary to represent the primitive at the sampling positions (i.e. "shades" each sampling point). This can involve applying textures, blending sampling point data values, etc.

In 3D graphics literature, the term "rasterisation" is sometimes used to mean both primitive conversion to sampling points and rendering. However, herein "rasterisation" will be used to refer to converting primitive data to sampling point addresses only.

The rasterisation process basically maps the primitives defining the render output to be generated to the sampling points that will be used to render the output. This is typically done by determining, for each sampling point, whether the sampling point position is covered by the primitive in question or not. This determination is typically done by testing the sampling points' positions against the edges of the primitive, to see if the sampling points are covered by the primitive. To do this, graphics processing systems typically derive (line) equations representing each of the edges of a primitive (e.g. using the defined vertices of the primitive), and then test the sampling points' positions using these edge equations. If a sampling point "passes" the edge test, it is taken to be within the primitive.

The rasterisation process is typically carried out by testing sets of one or more sampling points. For each set of one or more sampling points found to include a sampling point that is covered by the primitive in question (being tested), a discrete graphical entity usually referred to as a graphics "fragment", on which the graphics processing operations (such as rendering) are to be carried out, is then generated by the rasteriser and sent to the rest of the graphics processing pipeline (such as the renderer) for processing.

One drawback of current graphics processing systems is that because primitives are processed sequentially, and typically not in perfect front-to-back order, a given sampling position (and hence pixel(s)) may be shaded multiple-times as an output is processed, e.g. for display. This occurs when a first received and rendered primitive is subsequently covered by a later primitive, such that the rendered first primitive is not in fact seen at the sampling position(s) (and pixel(s)) in question. Primitives can be overwritten many times in this manner and this typically leads to multiple, ultimately redundant, rendering operations being carried out for each render output, e.g. frame, being rendered. This phenomenon is commonly referred to as "overdraw".

A number of techniques have therefore been proposed to try to reduce the amount of "overdraw" (the amount of redundant processing of hidden surfaces) that is performed when processing a render output, such as a frame for display (i.e. to avoid rendering non-visible primitives and/or fragments, etc.). For example, forms of hidden surface removal may be carried out before a primitive and/or fragment is sent for rendering, to see if the primitive or fragment etc. will be obscured by a primitive that has already been rendered (in which case the new fragment and/or primitive need not be rendered). Such hidden surface removal may comprise, for example, early occlusion culling, such as early depth (Z) and/or stencil (S) testing processes.

These arrangements try to identify, e.g., sampling points for a new primitive that will be occluded by already processed primitives (and therefore that do not need processing) before the sampling points are issued to the rendering pipeline. In these arrangements, the depth value, e.g., of a new primitive to be processed at the sampling position(s) in question is compared to the current depth values for the sampling position(s) in a depth buffer to see if the new primitive is occluded at the sampling position(s) in question or not. This can help to avoid sending fragments that are occluded by already processed primitives through the rendering pipeline.

The Applicants have developed a "hierarchical" rasterisation arrangement, in which primitives are iteratively tested against progressively smaller patches (regions) of the render output (target) area (and thus, correspondingly, patches of sampling positions (and patches of fragments)). In these arrangements, a primitive to be rasterised is first tested against a larger patch (e.g. a tile in a tile-based graphics processing system) of the render output, to determine if the primitive covers (at least in part) any smaller patches of the render output that the larger patch encompasses. If the primitive does cover (at least in part) any smaller patches of the render output that the larger patch encompasses, then the larger patch is sub-divided into those smaller patches, and the process is then repeated for each smaller patch of the render output that was found to be at least partially covered by the primitive, until a minimum or smallest patch size is reached. The smallest patch is then sample tested to determine which sampling points and thus fragments for that patch are covered by the primitive, and the covered fragments are output by the rasteriser for further processing (e.g. shading) by the graphics processing system.

The Applicants believe there remains scope for improvements in processing graphics primitives to generate a render output in a graphics processing system.

BRIEF DESCRIPTION OF THE DRAWINGS

Embodiments of the technology described herein will now be described by way of example only and with reference to the accompanying drawings, in which.

Like reference numerals are used for like features throughout the drawings, where appropriate.

DETAILED DESCRIPTION

Figure 1:
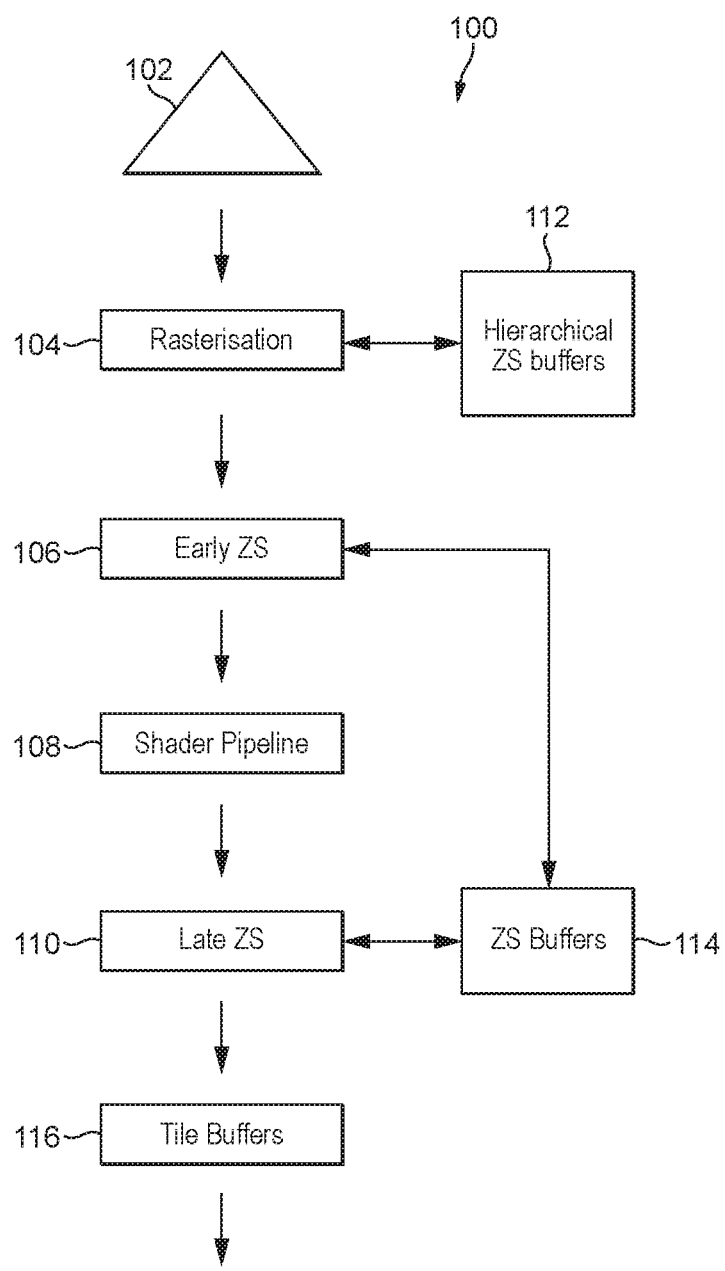
FIG. 1 shows schematically a graphics processing system that can be operated in accordance with the technology described herein.

A first embodiment of the technology described herein, comprises a method of processing a primitive when generating a render output in a graphics processing system in which, for the purposes of generating the render output, the render output is divided into a plurality of larger patches, each larger patch encompassing a set of plural smaller patches of the render output, the method comprising:
performing, by a rasteriser of the graphics processing system, the steps of:
testing a larger patch of the render output against a primitive to be processed to determine if the primitive to be processed at least partially covers the larger patch of the render output;
when it is determined that the primitive only partially covers the larger patch of the render output, subdividing the larger patch into a set of plural smaller patches of the render output and testing at least one of the smaller patches of the render output against the primitive to be processed to determine if the primitive to be processed at least partially covers the at least one smaller patch of the render output; and
when it is determined that the primitive completely covers the larger patch of the render output, outputting the larger patch in respect of the primitive from the rasteriser for processing by a subsequent stage of the graphics processing system.

A second embodiment of the technology described herein, comprises a graphics processing system in which, for the purposes of generating a render output, the render output is divided into a plurality of larger patches, each larger patch encompassing a set of plural smaller patches of the render output, the graphics processing system comprising a rasteriser configured to:
test a larger patch of the render output against a primitive to be processed to determine if the primitive to be processed at least partially covers the larger patch of the render output; and
when it is determined that the primitive only partially covers the larger patch of the render output, sub-divide the larger patch into a set of plural smaller patches of the render output and test at least one of the smaller patches of the render output against the primitive to be processed to determine if the primitive to be processed at least partially covers the at least one smaller patch of the render output; and
when it is determined that the primitive completely covers the larger patch of the render output, output the larger patch in respect of the primitive from the rasteriser for processing by a subsequent stage of the graphics processing system.

The technology described herein relates to computer graphics processing in which, for the purposes of generating a render output, the render output can be divided into a plurality of larger patches, with each larger patch encompassing a set of plural smaller patches of the render output. A larger patch of the render output can then be tested against a primitive to be processed to determine if the primitive to be processed at least partially covers the larger patch of the render output. This can allow, for example, for a primitive to be discarded (culled) from further consideration in respect of a larger patch of the render output at an early stage in the rasterisation process (i.e. when a larger patch is determined as not being even at least partially covered by the primitive). Conversely, when the larger patch is at least partially covered by the primitive, the primitive can be retained by the graphics processing system for further processing in respect of the patch. This hierarchical consideration of patches in relation to primitives can allow the rasteriser to process primitives in a highly efficient manner.

In such an arrangement, a set of graphics fragments may be generated by the rasteriser from a patch that is at least partially covered by a primitive. However, the Applicants have identified that generating graphics fragments in the rasteriser for a larger patch that is completely covered by a primitive can lead to inefficient processing of primitives. In particular, the process of generating the graphics fragments for a larger patch can consume significant processing resources in the rasteriser. Furthermore, the output of the rasteriser can become blocked while graphics fragments are being generated for that larger patch prior to output. The Applicants have further identified that, in the case of a completely covered larger patch, there may be no need for the rasteriser itself to generate the graphics fragments for that larger patch prior to output. For example, since the larger patch is already known to be completely covered by the primitive, there may be no need for the rasteriser itself to determine which graphics fragments corresponding to the larger patch are actually covered by that primitive. Instead, the Applicants have identified that a subsequent stage of the graphics processing system can be suitably configured to handle patches and/or to generate graphics fragments for patches.

Thus, in the technology described herein, when it is determined that a primitive completely covers a larger patch of the render output, that larger patch is (e.g. as a whole) output from the rasteriser, e.g. without the rasteriser generating a set of graphics fragments for the larger patch in respect of the primitive. This can then reduce the processing burden placed on the rasteriser and can prevent the output of the rasteriser from becoming blocked while graphics fragments for the larger patch are being generated. This in turn can allow the rasteriser to process primitives in an even more efficient manner.

The primitive to be processed in the technology described herein may comprise any desired and suitable polygon that can be processed for a render output, such as a triangle or quadrilateral. The primitive may be defined by and represented as a set of vertices. Each vertex for a primitive may have associated with it a set of data (such as position, colour, texture and/or other attributes data) representing the vertex.

The render output to be generated and that is divided into patches may comprise any desired and suitable render output that is to be generated by the graphics processing system (pipeline). Thus, it may comprise, for example, a tile to be generated in a tile-based graphics processing system (pipeline) and/or a frame (e.g. an image or a texture) of output fragment data.

The patches that the render output may be divided into can take any desired and suitable form. Each patch within a given hierarchical level of patches may represent a respective distinct region (area) of the render output to be generated. Each smaller patch within a given lower hierarchical level of patches may represent a respective distinct sub-region (sub-area) of the region (area) represented by a larger patch within a given higher hierarchical level.

The render output may be divided into at least (but typically more than) two hierarchical levels of patches. For example, the render output may be divided into a plurality of larger or largest ("first level", "higher level" or "highest level") patches. Each of these first level patches may then encompass a set of smaller ("second level" or "lower level") patches. Each of these second level patches may then encompass a set of even smaller ("third level" or "even lower level") patches, and so on. For example, each of these third level patches may then encompass a set of smallest ("fourth level" or "lowest level") patches. In embodiments, there may be four hierarchical levels of patches. Each of the largest patches may comprise an entire frame or tile of a tile-based graphics processing system.

The patches that the render output may be divided into may all have the same shape. Each patch that the render output may be divided into may be a regularly shaped area of the render output. The patches may be rectangular (including square). In embodiments, all the patches at a given hierarchical level may have the same size, and may also the same shape, as each other (and may cover the same number of sampling positions of the render output).

The respective sets of plural smaller patches of the render output that each larger patch of the render output may be sub-divided into (encompass) may contain any desired (plural) number of smaller patches of the render output. Each set of plural smaller patches that a given larger, higher level patch encompasses may comprise an integer number of plural smaller patches. In embodiments, each larger patch may be sub-divided into (encompass) a set of four smaller patches. Each larger patch may be sub-divided into (encompass) a 2×2 set (array) of smaller patches.

Thus, in an embodiment, the patches may be arranged such that a (and each) larger patch encompasses (and may accordingly be sub-divided into) a set of four smaller patches, with each smaller patch being a quarter of the size of the larger patch. Varying the patch sizes by a factor of 4 in each successive sub-division level is a particularly convenient arrangement for progressively decreasing the patch size as the process proceeds. However, it is not essential and other arrangements could be used if desired.

The patches may each correspond to a plurality of sampling positions of the render output to be generated. There may be any desired and suitable correspondence between sampling positions and output positions (e.g. pixels or texels) in the render output (e.g. frame, image or texture). For example, there may be a one to one mapping, a plural to one mapping, or a one to plural mapping, between sampling positions and output positions. Each sampling position may correspond to (only) one (potential) graphics fragment. Each graphics fragment may be (potentially) generated by testing for primitive coverage at one or more sampling point positions.

Each patch of the render output that is tested may correspond to an integer number of (potential) fragments, such as 64×64, 32×32, 16×16, 8×8, 4×4 and/or 2×2 fragments. In some embodiments, the largest patches may each correspond to 16×16 fragments, with the next smaller second level patches corresponding to 8×8 fragments, and the third level, even smaller patches corresponding to 4×4 fragments. The smallest, fourth level, patches may correspond to 2×2 fragments. In other embodiments, the largest patches may each correspond to 64×64, 32×32, 8×8 or 4×4 fragments.

It should be noted here that the terms "larger" and "smaller" used herein refer only to the relative sizes of the particular patches. In embodiments, the "larger" patch of the render output may correspond to the largest size of patch that the render output is divided into. However, the "larger" patch could instead be a patch other than a patch of the set of the largest patches that the render output is divided into. The technology described herein only requires that the larger patch is not a patch from the set of the smallest level of patches that the render output is sub-divided into. Likewise, the "smaller" patch could be from any particular level of patches, so long as it is from a level of patches that is smaller than the level of patches of the "larger" patch.

As discussed above, the rasteriser tests a patch of the render output against a primitive to be processed to determine if the primitive to be processed at least partially covers the patch of the render output. This test may be performed by any desired and suitable circuitry of the rasteriser, which may be referred to herein as "patch sub-divider" circuitry.

The rasteriser can test a particular patch of the render output against a particular primitive to determine if the primitive at least partially covers the patch in any desired and suitable manner. For example, the rasteriser may test each edge of the primitive against the particular patch. These edge tests may be performed, for example, by deriving (line) equations representing each of the edges of the primitive, and testing these edge equations against patch testing points of the patch. For example, a pattern or grid of patch testing points may be derived for the patch (and for each patch) being tested, and those patch testing points then used with (line) equations representing the edges of the primitive in question to determine if the patch is at least partially covered by the primitive.

A patch to be tested may comprise any desired and suitable number of patch testing points. For example, a patch to be tested may comprise plural (e.g. 9 or 16) patch testing points. The patch testing points may also be applied in any desired and suitable pattern. For example, the patch testing points may be provided at or towards respective corners of the smaller patches that the larger patch encompasses. One or more of the sampling points for the fragments corresponding to the patch (e.g. one or more or all of sampling points for the corner fragments of the smaller patches that the larger patch encompasses) may be used as the patch testing points.

In embodiments, the rasteriser may determine whether a particular patch is at least partially covered by a primitive, by one or more or all of: determining whether one or more patch testing points are within the edges of the primitive; determining whether edges of the patch are crossed by edges of the primitive; determining whether the vertices of the primitive are within the edges of the patch; determining whether the vertices of the primitive lie on the edges of the patch. Each edge of a patch may be defined by two or more (e.g. corner) patch testing points.

In embodiments, the rasteriser may determine that a particular patch of the render output is at least partially covered by a primitive if at least one of the following conditions is met: at least one patch testing point is within the edges of the primitive; at least one edge of the patch is crossed by an edge of the primitive; at least one vertex of the primitive is within the edges of the patch; or at least one vertex of the primitive is on a patch edge and, if the vertex is on the patch edge, another vertex of the primitive is on another edge of the patch, or if the vertex is on a corner of the patch, another vertex is on the opposite corner or on one of the opposite edges of the patch.

In some embodiments, the rasteriser may determine that a larger patch of the render output is at least partially covered by a primitive if at least one of its smaller patches is at least partially covered by a primitive (e.g. using the above conditions). However, in other embodiments, the rasteriser may determine that a larger patch of the render output is at least partially covered by a primitive (e.g. using the above conditions) without reference to its smaller patches.

In embodiments, the rasteriser further tests a particular patch of the render output against a primitive to determine if the primitive completely covers the patch. This can be determined in any desired and suitable manner. In embodiments, a primitive may be determined to completely cover a particular patch if all of the patch testing points for that patch are within or lie on the edges of the primitive.

In some embodiments, the rasteriser may determine that a larger patch of the render output is completely covered by a primitive all of its smaller patches are completely covered by a primitive (e.g. using the above condition). However, in other embodiments, the rasteriser may determine that a larger patch of the render output is completely covered by a primitive (e.g. using the above condition) without reference to its smaller patches.

Testing a patch of the render output against a primitive to be processed may further comprise one or more additional tests (i.e. in addition to a primitive coverage test as described above). For example, testing a patch of the render output against a primitive to be processed may further comprise a "hierarchical" depth and/or stencil test.

Performing a hierarchical depth test for a particular patch can allow the system to determine whether or not a second primitive is occluded by a first primitive over that particular patch (or vice-versa). As will be understood, performing a hierarchical depth test for a particular patch allows the rasteriser to (potentially) cull a primitive in respect of that patch, if the depth values relating to that primitive are found to fail the depth test against the depth values for another primitive in respect of that patch (i.e. if the primitive is found to be occluded by another primitive over that patch).

When a patch fails the hierarchical depth and/or stencil test in respect of a primitive (such that that primitive will be overdraw and thus not visible in the render output), the patch may not be output from the rasteriser in respect of that primitive (even if that patch is determined as being completely covered by the primitive). Conversely, when a patch (completely) passes the hierarchical depth and/or stencil test in respect of a primitive (such that that primitive may be visible in the render output), the patch may be output from the rasteriser in respect of that primitive as discussed above.

However, when the result of the hierarchical depth and/or stencil test for a patch in respect of a primitive is inconclusive (such that that primitive may or may not be visible or may be only partially visible in the render output), the patch may be sub-divided into a set of plural smaller patches of the render output as discussed above (even if that patch is determined as being completely covered by the primitive). This is because further consideration of the patch at a lower level of sub-division is likely to be desirable.

Depth data that is representative of one or more primitives in respect of a patch may accordingly be used and/or stored (and/or updated following a depth test). The depth data may comprise any suitable data (e.g. a depth range (minimum and maximum depths) for a patch or primitive and/or a depth (e.g. testing point or vertex) value or values for a patch or primitive and/or a depth function (e.g. coefficients for a plane equation) for a primitive) that is representative of the depth of one or more primitives in respect of a patch.

The depth and/or stencil data may be stored in any desired and suitable storage that is able to be accessed by the rasteriser. The storage may be dedicated storage for the purpose of storing depth and/or stencil data, or it may be part of storage that is used to store other data in addition to the depth and/or stencil data. The storage may be any desired and suitable data storage, such as, e.g., a register or registers, a buffer or buffers, a cache or caches, main memory, etc.

When depth data relating to a first primitive has been stored, the rasteriser may use this stored depth data to then perform a depth test for a patch in respect of a second primitive. Thus, in embodiments of the technology described herein, depth data relating to a first primitive may be used to perform a depth test for a patch in respect of a second primitive that at least partially covers that patch. In embodiments, the depth test for a particular patch may be performed by comparing depth range values relating to the first primitive over that patch to depth range values relating to the second primitive over that particular patch.

After performing the depth test for a patch that was found to be at least partially covered by the second primitive, the rasteriser may store depth data for that patch, based on the result of the depth test performed in respect of that patch. The depth data that is stored for the patch may comprise depth data relating to the first primitive, or depth data relating to the second primitive, or a combination thereof.

It should be noted here that the terms "first primitive" and "second primitive" used herein refer only to the order of the primitives as they are processed by the rasteriser in relation to each other. Thus, for example, it should be understood that the "first" primitive as described herein need not be the very first primitive that is processed by the rasteriser for the render output (e.g. frame) (although it may so happen to be). Correspondingly, the "second" primitive as described herein need not be the second primitive that is processed by the rasteriser for the render output. Rather, the "first" primitive is processed by the rasteriser prior to processing the "second" primitive. It should also be understood that the "second" primitive need not necessarily be processed directly (immediately) after the "first" primitive. For example, one or more other primitives may be processed by the rasteriser in between the "first" and "second" primitives, i.e. after the "first" primitive is processed but before the "second" primitive is processed.

For another example, testing a patch of the render output against a primitive to be processed may further comprise determining whether the patch is intersected by a scissor region of the render output. The scissor region may be rectangular (including square), and thus may be referred to herein as a "scissor box". Fragments may not be generated or may be discarded (culled) as a result of applying the scissor region to the render output, e.g. if those fragments are outside the scissor region. Thus, when a patch is determined as being intersected by a scissor region, the patch may be sub-divided into a set of plural smaller patches of the render output as described above (even if that patch is determined as being completely covered by the primitive). This is because further consideration of the patch at a lower level of sub-division is likely to be desirable.

The above one or more tests may be performed by any desired and suitable circuitry of the rasteriser, such as the patch sub-divider circuitry described above.

As discussed above, embodiments may comprise, when it is determined that the primitive completely covers the larger patch of the render output (and, e.g., when any other tests are suitably passed), outputting the larger patch in respect of the primitive from the rasteriser without the rasteriser generating a set of graphics fragments for the larger patch in respect of the primitive, e.g. without the rasteriser generating any graphics fragments for the larger patch in respect of the primitive. For example, embodiments may comprise, when it is determined that the primitive completely covers the larger patch of the render output (and, e.g., when any other tests are suitably passed), outputting the larger patch in respect of the primitive from the rasteriser without determining which sampling point positions for a set of graphics fragments corresponding to the larger patch are covered by the primitive to be processed.

For example, the rasteriser may comprise fragment generating circuitry configured to generate a set of graphics fragments for a patch (e.g. a "sample tester" configured to determine which sampling point positions for a set of graphics fragments corresponding to a patch are covered by a primitive to be processed and, e.g. to generate (for each fragment) a coverage (bit) mask indicating which sampling points (of the fragment in question) are covered).

The rasteriser may further comprise bypass circuitry configured to, when it is determined that the primitive completely covers the larger patch of the render output (and, e.g., when any other tests are suitably passed), bypass the fragment generating circuitry so as to output the larger patch in respect of the primitive from the rasteriser without the fragment generating circuitry of the rasteriser generating a set of graphics fragments for the larger patch in respect of the primitive (e.g. so as to output the larger patch in respect of the primitive from the rasteriser without the sample tester of the rasteriser determining which sampling point positions for a set of graphics fragments corresponding to the larger patch are covered by the primitive to be processed and, e.g. without needing to generate (for each fragment) a coverage (bit) mask indicating which sampling points (of the fragment in question) are covered, thereby increasing throughput without needing to increase the amount of storage needed for coverage masks).

Furthermore, embodiments may comprise, when it is determined that the primitive completely covers the larger patch of the render output (and, e.g., when any other tests are suitably passed), outputting the larger patch in respect of the primitive from the rasteriser without the rasteriser (e.g. patch sub-divider circuitry) sub-dividing the larger patch into a set of plural smaller patches. Again, this can reduce the processing burden placed on the rasteriser. However, in other embodiments, the larger patch may still be sub-divided and output as a set of plural (but still known to be completely covered) smaller patches.

As discussed above, when it is determined that the primitive to be processed only partially covers the larger patch of the render output (or, e.g. when any other tests are not suitably passed), the larger patch is sub-divided (e.g. by patch sub-divider circuitry) into a set of plural smaller patches of the render output.

When a larger patch is sub-divided into a set of plural smaller patches, the rasteriser may buffer one or more or all of the smaller patches within a buffer of the rasteriser to await further testing (e.g. by the patch sub-divider circuitry). A smaller patch may then be selected (e.g. by a multiplexer) for further testing (e.g. by the patch sub-divider circuitry), e.g. when sufficient processing resources become available. A (respective) patch buffer may be provided for one or more levels of the patch hierarchy (e.g. for each level except the highest level). The (and, e.g., each) buffer may be operated substantially in the manner of a FIFO, i.e. by selecting patches on a first-in-first-out basis.

In these embodiments (in which one or more patch buffers are provided in the rasteriser), when it is determined that a larger patch is completely covered by a primitive to be processed (such that the larger patch can be output by the rasteriser in respect of that primitive), the completely covered larger patch may not be output immediately from the rasteriser but may be buffered within a buffer of the rasteriser, e.g. as though it were a smaller patch, to await output from the rasteriser. The completely covered larger patch may then be selected from the buffer, and e.g. passed through the patch sub-divider circuitry, as though it were a smaller patch, but without that patch being re-tested and/or sub-divided. The completely covered larger patch may be selected from the buffer as a single larger patch, e.g. in a single processing cycle, rather than as plural respective smaller patches, e.g. in plural respective processing cycles, that are encompassed by that completely covered larger patch.

Furthermore, where a respective buffer is provided for one or more levels of the patch hierarchy, the completely covered larger patch may be buffered in a buffer nominally provided for smaller patches of the next level down in the patch hierarchy. When the completely covered larger patch is selected from that buffer, and e.g. passed through the patch sub-divider circuitry, as though it were a smaller patch, the completely covered patch may then be re-buffered, e.g. in a buffer nominally provided for even smaller patches of the next level down (if there is one) in the patch hierarchy, and so on, and/or output from the rasteriser. This process of selecting a completely covered larger patch from a buffer and passing the completely covered patch through the patch sub-divider circuitry, but without re-testing and/or sub-division being performed on the larger patch, may be performed (repeated) until the completely covered larger patch reaches a patch buffer nominally provided for the smallest patch size and/or is output from the rasteriser to the subsequent stage of the graphics processing system.

Thus, embodiments may comprise, when it is determined that the primitive completely covers the larger patch of the render output (and, e.g., when any other tests are suitably passed), buffering the larger patch in a buffer of the rasteriser, selecting the larger patch from the buffer (and, e.g., passing the larger patch through patch sub-divider circuitry of the rasteriser, without the patch sub-divider circuitry re-testing the larger patch against the primitive to be processed to determine if the primitive to be processed at least partially covers the larger patch), and re-buffering the larger patch in a buffer of the rasteriser and/or outputting the larger patch from the rasteriser.

These embodiments can help to maintain at least a degree of the original primitive rasterisation order when processing plural primitives for the render output. This may, for example, be desirable or necessary for certain types of graphics processing in which primitive rasterisation order should be substantially maintained by the graphics processing system.

In some embodiments, priority may nevertheless be given to selecting completely covered patches from a buffer, e.g. for passing through the patch sub-divider circuitry and/or re-buffering, over selecting patches for new primitives and/or over selecting only partially covered patches from a buffer for testing (e.g. whilst still operating each respective patch buffer in the manner of a FIFO). Thus, a completely covered patch may be selected from (e.g. the front of) a buffer in favour of a patch for a new primitive and/or in favour of a partially covered patch stored in (e.g. at the front of) a (different) buffer of the rasteriser. This can help to more quickly output any completely covered patches from the rasteriser that will not be processed further by the rasteriser and thus will not contribute to sufficient work or "back pressure" in the rasteriser.

Priority may also be given to selecting completely covered patches from a buffer nominally provided for smaller patches, e.g. for passing through the patch sub-divider circuitry and/or re-buffering, over selecting completely covered patches from a buffer nominally provided for larger patches (e.g. whilst still operating each respective patch buffer in the manner of a FIFO). Thus, a completely covered patch may be selected from (e.g. the front of) a buffer nominally provided for smaller patches in favour of a completely covered patch stored in (e.g. at the front of) a (different) buffer nominally provided for larger patches. Prioritising completely covered patches from a buffer nominally provided for smaller patches can help to create space in that buffer (which will tend to fill up as plural smaller patches tend to be more numerous) and so further help to prevent the rasteriser from becoming blocked.

In the absence of completely covered patches, priority may be given to selecting larger patches over selecting smaller patches from a buffer. For example, priority may be given to selecting larger patches for new primitives that are input to the rasteriser. Priority may then be given to selecting larger partially covered patches from a buffer. Priority may then be given to selecting smaller partially covered patches from a buffer. Thus, in embodiments, a new larger patch may be selected (e.g. from an input to the rasteriser) in favour of a partially covered patch stored in (e.g. at the front of) a buffer of the rasteriser. Similarly, in embodiments, a partially covered larger patch may be selected from (e.g. the front of) a buffer in favour of a partially covered smaller patch stored in (e.g. at the front of) a (different) buffer of the rasteriser. In this case, prioritising new larger patches or larger partially covered patches can help to create more work or "back pressure" for the rasteriser in the form of plural smaller patches. This in turn can help to prevent processing "bubbles" from forming.

The selection of patches may be performed by any desired and suitable selecting circuitry of the rasteriser, such as a multiplexer or other switching circuitry.

As discussed above, when it is determined that the primitive to be processed only partially covers the larger patch of the render output (or, e.g. when any other tests are not suitably passed), embodiments may comprise testing a smaller patch (that is encompassed by the larger patch of the render output) against the primitive to be processed to determine if the primitive to be processed at least partially covers the smaller patch of the render output.

When it is determined that the primitive to be processed completely covers the smaller patch of the render output (and, e.g. when any other tests are suitably passed), the smaller patch may be output in respect of the primitive from the rasteriser to the subsequent stage of the graphics processing system. Again, the smaller patch may be output without the rasteriser generating a set of graphics fragments for the smaller patch in respect of the primitive, and/or without determining which sampling point positions for a set of graphics fragments corresponding to the smaller patch are covered by the primitive to be processed, and/or without the rasteriser sub-dividing the smaller patch into a set of plural even smaller patches.

However, when it is determined that the primitive only partially covers the smaller patch of the render output (or, e.g., when any other tests are not suitably passed), the smaller patch may be sub-divided into a set of plural even smaller patches of the render output and at least one of the even smaller patches of the render output may be tested against the primitive to be processed to determine if the primitive to be processed at least partially covers the at least one even smaller patch of the render output.

Thus, in some embodiments, when a larger patch is only partially covered by a primitive (or, e.g., when any other tests are not suitably passed), one or more smaller patches at successively lower levels of the patch hierarchy may be considered by the rasteriser, e.g. until a completely covered patch is identified and output in respect of the primitive and/or until the smallest patch size is reached.

In any of above embodiments, when it is determined that the primitive to be processed does not at least partially cover a patch of the render output (or, e.g., when any other tests are entirely failed), the rasteriser may discard (cull) that primitive from further processing in respect of that patch (however, that patch region may, and will usually, be considered again for one or more other primitives and/or the primitive may be considered again for one or more other new larger patches). Discarding (culling) the primitive from further processing in respect of the patch may comprise not outputting that patch and/or fragments corresponding to that patch from the rasteriser in respect of the primitive. This can, for example, avoid the graphics processing system wasting further processing resources on processing that patch and/or fragments corresponding to that patch in respect of the primitive.

When the smaller or smallest patch is reached (e.g. because a completely covered patch that encompasses that smaller or smallest patch has not been found and/or because that smaller or smallest patch is only partially covered), the rasteriser may generate a set of one or more graphics fragments from that smaller or smallest patch. Generating the set of one or more graphics fragments from a patch may comprise fragment generating circuitry (such as the sample tester discussed above) determining which sampling point positions for a set of graphics fragments corresponding to that patch are actually covered by the primitive to be processed and generating one or more graphics fragments (and, e.g., one or more coverage (bit) masks) accordingly.

Each fragment may comprise data for a set of one or more (covered) sampling points. Each fragment may represent (have associated with it) a single sampling point, or a set of plural sampling points, as desired. A fragment may accordingly be tested for primitive coverage using any desired and suitable number of sampling points. For example, a fragment may be tested using only one sampling point (for single-sampled mode) or may be tested using a set of plural (e.g. 4) sampling points (for multi-sampled mode, e.g. for antialiasing purposes).

A or each sampling point may be applied in respect of the fragment with any desired and suitable offset from an (e.g.

x,y) position in the render output corresponding to the fragment. Also, when multi-sampled mode is used, plural sampling points may be applied in respect of the fragment with any desired and suitable sampling point pattern, such as a (4×) ordered grid or (4×) rotated grid.

In embodiments, a (fully covered) patch that is buffered in and/or output from the rasteriser in respect of a primitive can take any desired and suitable form. In some embodiments, a (fully covered) patch that is buffered in and/or output from the rasteriser in respect of a primitive may be in the form of a signal or data structure that indicates and/or describes the (fully covered) patch in question.

In a similar manner to a (fully covered) patch, one or more other signals or data structures may also be buffered in and/or output by the rasteriser, for example while maintaining an output order for those signals or data structures relative to an input order for those signals or data structures. For example, in a similar manner to a (fully covered) patch, those one or more other signals or data structures may be buffered (e.g. in the patch buffer(s) mentioned above) and/or may bypass the sample tester (e.g. via the bypass circuitry described above). These one or more other signals or data structures may, for example, indicate and/or describe one or more of: the beginning of a tile or frame (e.g. for synchronization purposes); the end of a tile or frame (e.g. for synchronization purposes); a (e.g. depth and/or stencil) buffer clear and/or pre-load instruction; and a full-tile or full-frame primitive (e.g. which represents a previously (partially) rendered version of the tile or frame (which may be referred to as a "frame shader")), etc.

In embodiments, one or more or all of the patch sizes in the patch hierarchy may be able to be output from the rasteriser in respect of a primitive and handled by the subsequent stage of the graphics processing system in the manner of the technology described herein. However, in other embodiments, only one (e.g. the largest) patch size or a subset (e.g. two) of the patch sizes in the patch hierarchy may be able to be output from the rasteriser in respect of a primitive and handled by the subsequent stage of the graphics processing system in the manner of the technology described herein.

In some situations, only certain sized (e.g. 16×16 and/or 4×4) patches of the patch hierarchy may be able to be output from the rasteriser in respect of a primitive and handled by the subsequent stage of the graphics processing system in the manner of the technology described herein (with any other sizes of (fully covered and/or partially covered) patches being used to generate graphics fragments for output from the rasteriser). This may be the case, for example, when the subsequent stage of the graphics processing system (which may comprise a patch depth and/or stencil testing stage) is only configured to handle certain sized patches (and, e.g., when there is relevant depth and/or stencil data, such that the depth and/or stencil testing stage needs to perform depth and/or stencil testing on the patch in respect of the primitive).

In other situations, any sized patch of the patch hierarchy may be able to be output from the rasteriser in respect of a primitive and handled by the subsequent stage of the graphics processing system in the manner of the technology described herein. This may be the case, for example, when the subsequent stage of the graphics processing system (which may comprise a patch depth and/or stencil testing stage) is configured to handle any sized patch (or when there is not yet any relevant depth and/or stencil data, such that the depth and/or stencil testing stage does not need to perform depth and/or stencil testing on the patch in respect of the primitive).

Since a patch (e.g. rather than one or more graphics fragments generated from that patch) may be output from the rasteriser in respect of the primitive, the subsequent stage of the graphics processing system to the rasteriser may comprise a graphics processing stage that is configured to process patches (e.g. rather than or in addition to being configured to process graphics fragments), e.g. in response to receiving a signal or data structure that indicates and/or describes the patch in question. In some embodiments, one or more subsequent stages of the graphics processing system may be configured to process patches (e.g. rather than or in addition to being configured to process graphics fragments). The subsequent stage(s) of the graphics processing system may or may not be the immediately subsequent stage(s) of the graphics processing system to the rasteriser.

The subsequent stage of the graphics processing system to the rasteriser may, for example, comprise (e.g. dedicated) patch fragment generating circuitry that that is configured to generate graphics fragments from a patch in respect of a primitive. Thus, the patch fragment generating circuitry may generate a set of graphics fragments from a (fully covered) patch (e.g. a larger patch or one or more smaller patches that are encompassed by the larger patch) in respect of the primitive. The fragments generated by the patch fragment generating circuitry may then be passed from the patch fragment generating circuitry to a further subsequent stage of the graphics processing system for further processing. The further subsequent stage of the graphics processing system may be any desired and suitable stage of a graphics processing system that is configured to receive and process graphics fragments, e.g. in a conventional manner. The further subsequent stage of the graphics processing system may, for example, comprise a (early) depth and/or stencil testing stage that is configured to receive and process (depth and/or stencil test) graphics fragments, e.g. in a conventional manner.

However, depending on its capabilities, such (dedicated) patch fragment generating circuitry could still block the output of the rasteriser when generating graphics fragments in certain circumstances. Thus, in alternative embodiments, the subsequent stage of the graphics processing system to the rasteriser may comprise a (early) patch depth and/or stencil testing stage (unit) that is configured to receive (from the rasteriser) and process (depth and/or stencil test) patches (e.g. rather than or in addition to being configured to receive (from the rasteriser) and process (depth and/or stencil test) graphics fragments). Thus, the patch depth and/or stencil testing stage may perform one or more depth and/or stencil tests for a (fully covered) patch (e.g. a larger patch or one or more smaller patches that are encompassed by the larger patch) in respect of the primitive. This can, for example, allow the patches to be processed (depth and/or stencil tested), e.g. as a whole, by the patch depth and/or stencil testing stage and thus further help to reduce the possibility of the output of the rasteriser being blocked.

Thus, another embodiment of the technology described herein, comprises a method of depth and/or stencil testing when generating a render output in a graphics processing system in which, for the purposes of generating the render output, the render output is divided into a plurality of larger patches, each larger patch encompassing a set of plural smaller patches of the render output, the method comprising:

performing, by a patch depth and/or stencil testing stage of the graphics processing system, the steps of:

receiving a larger patch (e.g. output by a rasteriser of the system) in respect of a primitive; and performing one or more depth and/or stencil tests for the patch in respect of the primitive.

Another embodiment of the technology described herein, comprises a graphics processing system in which, for the purposes of generating a render output, the render output is divided into a plurality of larger patches, each larger patch encompassing a set of plural smaller patches of the render output, the graphics processing system comprising a patch depth and/or stencil testing stage configured to:

receive a larger patch (e.g. output by a rasteriser of the system) in respect of a primitive; and perform one or more depth and/or stencil tests for the patch in respect of the primitive.

The above embodiments may comprise one or more or all of the features described herein in respect of any other embodiment, as desired. Thus, the features of the graphics processing system, render output, patches, patch depth and/or stencil testing stage, rasteriser, primitive, etc., described herein in respect of any other embodiment can, and in embodiments do, form part of the above embodiments.

In any of the embodiments described herein, the patch depth and/or stencil testing stage may be configured to receive certain patch sizes that can be output from the rasteriser as discussed above. The patch depth and/or stencil testing stage may comprise one or more buffers (queues) configured to receive and store patches (and, e.g. fragments) prior to processing (testing) by the patch depth and/or stencil testing stage. In one embodiment, a first buffer (queue) is provided for fragments and/or smaller (e.g. 4×4) patches, and a second buffer (queue) is provided for larger (e.g. 16×16) patches. Other buffer arrangements are possible.

The patch depth and/or stencil testing stage may be configured to test fragments and/or certain patch sizes. In one embodiment, (only) a smaller (e.g. 4×4) patch size (e.g., in addition to fragments) can be tested, e.g. as a whole, by the patch depth and/or stencil testing stage. Thus, in some embodiments, the patch depth and/or stencil testing stage may be configured to extract, for testing, fragments and/or smaller (e.g. 4×4) patches from a larger (e.g. 16×16) patch.

In embodiments, a data structure (such as an "extraction" bitmap) may be provided and maintained (e.g. by control circuitry of or for the depth and/or stencil testing stage) that indicates which fragments and/or smaller patches have been extracted for depth and/or stencil testing and/or which fragments and/or smaller patches are yet to be depth and/or stencil tested for the larger patch in question. Respective data structures (e.g. "extraction" bitmaps) may be provided for respective larger patches received and/or stored by the patch depth and/or stencil testing stage. In some embodiments, to limit memory usage, the number of data structures (e.g. "extraction" bitmaps) available for association with larger patches received and/or stored by the depth and/or stencil testing stage may be limited at any one time, e.g. to 1 or 2 data structures ("extraction" bitmaps). The one or more available data structures (e.g. "extraction" bitmaps) may be associated with the oldest or older larger patches received and/or stored by the patch depth and/or stencil testing stage.

In one embodiment, when a (e.g. 4×4) patch is single-sampled, that patch may be tested by the patch depth and/or stencil testing stage as a whole. Conversely, when the (e.g. 4×4) patch is multi-sampled, the patch may be tested as plural respective multi-sampled fragments. In this regard, the Applicants have identified that a (e.g. 4×4) patch that is sample tested in single-sampling mode can have the same number of sampling points (e.g. 4×4×1=16 sampling points in total), and thus may be handled in substantially the same way and by substantially the same processing circuitry, as plural (e.g. 4) respective fragments that are (e.g. ×4) multi-sampled (which may also have, e.g., 2×2×4=16 sampling points in total).

Thus, the processing circuitry of the patch depth and/or stencil testing stage may be configured to test plural sampling points for one or more (e.g. 4) (e.g. (×4) multi-sampled) fragments substantially simultaneously, and may also be configured to test plural sampling points for a (e.g. 4×4) (e.g. single-sampled) patch, e.g. as a whole. This can allow the processing circuitry of the patch depth and/or stencil testing stage to be operated at both the fragment level and the patch level.

The patch depth and/or stencil testing stage may be configured to test fragments and/or patches in any desired and suitable way. For example, the patch depth and/or stencil testing stage may have access to storage that stores depth and/or stencil data for sampling positions of the render output.

The depth and/or stencil data may be stored in any suitable and desired storage that is able to be accessed by the patch depth and/or stencil testing stage. The storage may be dedicated storage for the purpose of storing depth and/or stencil data, or it may be part of storage that is used to store other data in addition to the depth and/or stencil data. The storage may be any suitable and desired information storage, such as, e.g., a register or registers, a buffer or buffers, a cache or caches, main memory, etc.

The patch depth and/or stencil testing stage may be configured to test a patch received in respect of a primitive against corresponding (in terms of sampling position) stored depth and/or stencil data (e.g. in addition to being configured to test depth and/or stencil values for fragments against corresponding stored depth and/or stencil data). This patch depth and/or stencil testing may comprise comparing a depth range or value or values for a patch in respect of the primitive in question against corresponding (in terms of sampling position) stored depth and/or stencil data.

When the patch depth and/or stencil test for a patch is failed (e.g. such that the primitive that covers that patch will be occluded in the render output), the patch may be discarded (culled) by the patch depth and/or stencil testing stage. (However, the patch may still be retained for a least some further processing (e.g. the depth and/or stencil tester may still be configured to update the stencil buffer when the depth and/or stencil test for a patch is failed.) Conversely, when the patch depth and/or stencil test for a patch is at least partially passed (e.g. such that the primitive that covers the patch may be at least partially visible in the render output), the patch may be retained by the patch depth and/or stencil testing stage for further processing and/or output by the depth and/or stencil testing stage in respect of the primitive. The stored depth and/or stencil data may be updated accordingly, e.g. based on the depth range or value or values for the patch in respect of the primitive.

When the patch depth and/or stencil test for a patch is inconclusive (e.g. such that the primitive that covers the patch may or may not be visible in the render output), the patch may still be retained by the patch depth and/or stencil testing stage for further processing and/or output by the depth and/or stencil testing stage in respect of the primitive. The stored depth and/or stencil data may also be at least partially updated, e.g. based on the depth range or value or values for the patch in respect of the primitive.

Then, depending on the result of the patch depth and/or stencil test, the patch may be processed by patch fragment generating circuitry that generates graphics fragments from the patch in respect of the primitive.

The patch fragment generating circuitry in any of the above embodiments may take any desired and suitable form. As indicated above, the patch fragment generating circuitry may be prior to, may form part of, or may be subsequent to the depth and/or stencil testing stage. Since a patch that has been output from the rasteriser may already be known to be completely covered by a primitive to be processed, the patch fragment generating circuitry may not need to, and therefore may not, determine which sampling point positions for a set of graphics fragments corresponding to that patch are actually covered by the primitive. Instead, the fragment generating circuitry may assume that all of the sampling point positions for the set of graphics fragments corresponding to that patch are covered by the primitive to be processed, without testing sampling points for the graphics fragments of the patch for coverage by the primitive. The patch fragment generating circuitry may also be configured to pass through any graphics fragments that are received to a further subsequent stage of the graphics processing system.

As will be appreciated, embodiments of the technology described herein will typically be performed in respect of each one of plural primitives that potentially at least partially cover a larger patch making up the render output. As will also be appreciated, embodiments of the technology described herein will typically be performed in respect of each one of plural larger patch regions that make up the render output.

The technology described herein can be used irrespective of the form of output that the graphics processing system may be providing. Thus, for example, it may be used where the render output is intended to form an image (a frame) for display (e.g. on a screen or printer). However, the technology described herein may also be used where the render output is not intended for display, for example where the render output is a texture that the graphics processing system is being used to generate (e.g. in "render to texture" operation), or, indeed, where the output the graphics processing system is being used to generate is any other form of data array.

The technology described herein is applicable to any suitable form or configuration of graphics processing system, graphics processor, and renderer, such as one having a "pipelined" arrangement. The technology described herein is particularly applicable to tile-based graphics processors and graphics processing systems, and to multi-core graphics processing systems. Thus, in embodiments, the graphics processing system may be a tile-based graphics processing system. Similarly, in embodiments, the graphics processing system may be a multi-core system (i.e. that includes plural graphics processing cores).

The technology described herein accordingly extends to, and may comprise, a graphics processor including a graphics processing pipeline operable, and/or operated, in accordance with the method of any one or more of the embodiments of the technology described herein. Subject to any hardware necessary to carry out the specific functions discussed above, such a graphics processor can otherwise include any one or more or all of the usual functional units, etc., that graphics processors include.

The graphics processing system and pipeline can contain any suitable and desired processing stages, etc., that graphics processing systems and pipelines normally include. Thus, for example, it may include one or more of all of: a renderer (e.g. in the form of a fragment shader), early and late depth and/or stencil testing stages (tester), a blender, a write-out unit, etc.

In the case of a tile-based (tiling) graphics processing system, the pipeline may also comprise a tile buffer for storing tile sample values and/or a write out unit that operates to write the data in the tile buffer (e.g. once the data in the tile buffer is complete) out to external (main) memory (e.g. to a frame buffer).

In embodiments, the various functions of the technology described herein may be carried out on a single graphics processing platform that generates and outputs the rendered fragment data that is, e.g., written to a frame buffer for a display device.

In some embodiments, the system, pipeline, etc., comprises, and/or is in communication with, one or more buffers and/or memory devices that store the data described herein, and/or store software for performing the processes described herein. The system, pipeline, etc., may also be in communication with a host micro-processor, and/or with a display for displaying images based on the data generated by the graphics processing system.

The technology described herein can be implemented in any suitable system, such as a suitably configured micro-processor based system. In embodiments, the technology described herein may be implemented in a computer and/or micro-processor based system.

The various functions of the technology described herein can be carried out in any desired and suitable manner. For example, the functions of the technology described herein can be implemented in hardware or software, as desired. Thus, for example, the various functional elements, processing stages, and "means" of the technology described herein may comprise a suitable processor or processors, controller or controllers, functional units, circuitry, circuits, processing logic, microprocessor arrangements, etc., that are operable to perform the various functions, etc., such as appropriately configured dedicated hardware elements or processing circuitry/circuits and/or programmable hardware elements or processing circuitry/circuits that can be programmed to operate in the desired manner.

It should also be noted here that the various functions, etc., of the technology described herein may be duplicated and/or carried out in parallel on a given processor. Equally, the various processing stages may share processing circuitry, etc., if desired.

It will also be appreciated that all of the described embodiments of the technology described herein can include, as appropriate, any one or more or all of the features described herein.

The methods in accordance with the technology described herein may be implemented at least partially using software e.g. computer programs. It will thus be seen that further embodiments of the technology described herein comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

Not all steps of the methods of the technology described herein need be carried out by computer software and thus further embodiments of the technology described herein comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible medium, such as a non-transitory computer readable medium, for example, diskette, CD ROM, ROM, RAM, flash memory, or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

As discussed above, the technology described herein relates to arrangements in which a graphics processing system can divide a render output into plural larger patches, with each larger patch encompassing plural smaller patches. A rasteriser of the system can then test a larger patch against a primitive to be processed to determine if the primitive at least partially covers the larger patch. When it is determined that the primitive only partially covers the larger patch, the larger patch is sub-divided into plural smaller patches and at least one of the smaller patches is re-tested against the primitive. Conversely, when it is determined that the primitive completely covers the larger patch, the larger patch is output from the rasteriser in respect of the primitive for processing by a subsequent stage of the graphics processing system. The system can provide efficient, hierarchal, processing of primitives, whilst helping to prevent the output of the rasteriser from becoming blocked by generating fragments for larger fully covered patches.

FIG. 1 shows schematically a graphics processor 100 of a graphics processing system that implements a graphics processing pipeline that can be operated in accordance with the technology described herein. FIG. 1 shows the main elements and pipeline stages of a graphics processor 100 that are relevant to the operation of the present embodiment. As will be appreciated, there may be other elements of the graphics processor 100 that are not illustrated in FIG. 1. It should also be noted here that FIG. 1 is only schematic, and that, for example, in practice the shown functional units and pipeline stages may share significant hardware circuits, even though they are shown schematically as separate stages in FIG. 1. It will also be appreciated that each of the stages, elements and units, etc., of the graphics processor 100 as shown in FIG. 1 may be implemented as desired and will accordingly comprise, e.g., appropriate circuitry and/or processing logic, etc., for performing the necessary operation and functions.

The graphics processing system of FIG. 1 is a tile-based system. The graphics processor 100 will thus produce tiles of a render output data array, such as an output frame to be generated. However, the technology described herein is equally applicable to other systems, such as immediate mode rendering systems. The output data array may typically be an output frame intended for display on a display device, such as a screen or printer, but may also, for example, comprise a "render to texture" output of the graphics processor, etc.

FIG. 1 shows schematically the pipeline stages after the graphics primitives (polygons) 102 for input to the rasterisation process have been generated. Thus, at this point the graphics data (the vertex data) has undergone transformation and lighting operations (not shown), and a primitive set-up stage (not shown) has set-up the primitives 102 to be rendered in response to the commands and vertex data provided to the graphics processor 100.

As shown in FIG. 1, this part of the fragment processing pipeline of the graphics processor 100 includes a number of processing stages, including a rasterisation stage 104, an early depth and stencil (ZS) test stage 106, a rendering stage in the form of a fragment shading pipeline stage 108, and a late depth and stencil (ZS) test stage 110. The pipeline also includes and/or has access to (is in communication with) appropriate memory for storing the data that the pipeline will use and/or generate, such as hierarchical depth and stencil (ZS) buffer(s) 112, depth and stencil (ZS) buffer(s) 114, tile buffers 116, etc.

The rasterisation stage 104 can operate to rasterise primitives 102 making up the render output (e.g. the image to be displayed) into graphics fragments for processing. When doing this, the rasterisation stage 104 receives graphics primitives 102 to be rendered, and may rasterise primitives 102 to sampling points and generate graphics fragments having appropriate positions (representing appropriate sampling positions) for rendering the primitives 102. However, as will be discussed in more detail below, the rasterisation stage 104 can also output patches of the render output in respect of primitives 102, with a subsequent stage of the graphics processing pipeline later being used to generate the graphics fragments from the output patches.

In the present embodiment, each graphics fragment that can be generated in the graphics processing pipeline may have associated with it a single sampling point or plural (and typically four) sampling points. Other arrangements would, of course, be possible. When plural sampling points are used, each graphics fragment has associated with it a coverage bit mask indicating which sampling points of the plural sampling points that the fragment can represent, are actually being used when rendering the fragment (i.e. are actually covered by the primitive 102 in question).

In the present embodiment, the rasterisation stage 104 is a hierarchical rasterisation stage that can iteratively test primitives 102 against progressively smaller patches (regions) of the render output (target) area (and thus, correspondingly, patches of potential fragments), down to a minimum patch size corresponding, in the present embodiment, to a 2×2 group of potential fragments (a "quad"), discarding (culling) any patches that are not at least in part covered by the primitive 102. Thus, each patch that is tested corresponds to a set of potential fragments.

The rasterisation stage 104 also performs hierarchical depth tests on the patches considered by the rasterisation stage 104 to see if those patches can be culled. To do this, the rasterisation stage 104 performs an initial depth (Z) test on each at least partially covered patch to see if the patch can be discarded (culled) at this stage. At the same time, an initial stencil (S) test is carried out. A scissor box test can also be carried out at this stage.

The rasterisation stage 104 is accordingly in communication with hierarchical ZS buffer(s) 112. The hierarchical ZS buffer(s) 112 can store depth data (such as a range of depth values and/or depth function data) and a stencil value for each patch size and position that the buffer represents (essentially for each patch size and position that the rasterisation stage 104 could consider for the tile that is being processed).

In the present embodiment, the rasterisation stage 104 performs a hierarchical depth test on a patch, using a depth value range representative of the primitive 102 that at least partially covers that patch, by taking appropriate depth samples for the patch in respect of the primitive, and comparing the depth samples for the patch with the depth range data already stored in the corresponding entry for that patch position, to try to determine whether that patch will be occluded by or overdraw other fragments and sampling points to be rendered. If the patch passes the hierarchical depth test, then the depth value ranges stored in that entry of the hierarchical ZS buffer(s) 112 are updated accordingly.

The present embodiment supports four levels of sub-division (three sub-division iterations) and starts with larger patches corresponding to 16×16 potential fragments, which are then (if appropriate) sub-divided into four smaller 8×8 fragment patches. Each of those 8×8 fragment patches is then (if appropriate) sub-divided into four even smaller 4×4 fragment patches. Finally, each of those 4×4 fragment patches is then (if appropriate) sub-divided into four even smaller 2×2 fragment patches. As in the present embodiment, a 2×2 fragment patch is the minimum or smallest patch size that is used, the (potential) sub-division process stops at this point. Other arrangements would, of course, be possible.

Figure 2:
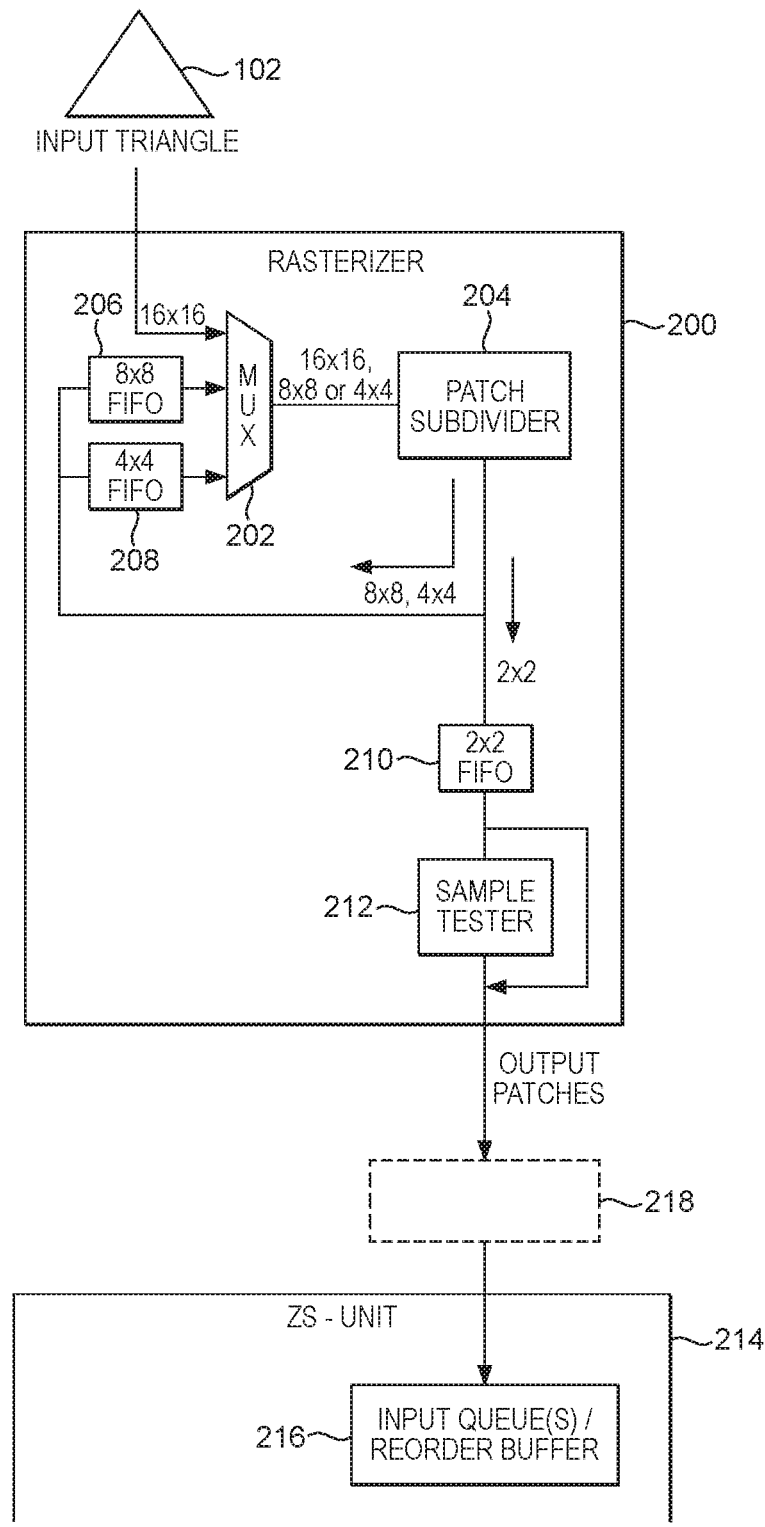
FIG. 2 shows schematically and in more detail a rasteriser of a graphics processing system that can be operated in accordance with the technology described herein.

FIG. 2 shows a rasteriser 200 for implementing the rasterisation stage 104. The rasteriser 200 comprises a multiplexer 202 that can receive an input primitive 102 and select a patch for consideration by the rasteriser 200. The rasteriser 200 also comprises a patch sub-divider 204 that can perform primitive coverage and initial hierarchical ZS testing in respect of the primitive 102. To do this, the multiplexer 202 initially receives a new input primitive 102 and selects a larger 16×16 patch (which, in the present embodiment, corresponds to the size of an entire tile) of the render output (the render target) area and passes this to the patch sub-divider 204. The patch sub-divider 204 then tests the larger patch against the edges of the primitive 102 in question to determine if the primitive 102 at least partially covers the larger patch (e.g. at least partially covers any patch of a 2×2 set of smaller patches of the render output that the larger patch can be sub-divided into (encompasses)).

The edges of the primitive 102 are represented by appropriate line (edge) equations that have been derived from the vertices of the primitive 102. A grid of patch testing points is derived for the patch (and for each patch) being tested. The patch testing points are then used with the line equations representing the edges of the primitive 102 in question to determine if the patch is at least partially covered by the primitive 102.

In the present embodiment, the patch sub-divider 204 of the rasteriser 200 determines that a patch of the render output is at least partially covered by a primitive 102 if at least one of the following conditions is met: at least one patch testing point is within the primitive 102; at least one edge of the patch is crossed by an edge of the primitive 102; at least one vertex of the primitive 102 is within the patch; or at least one vertex of the primitive 102 is at a patch edge and, if the vertex is at the patch edge, another vertex of the primitive 102 is at another edge of the patch, or if the vertex is at a corner of the patch, another vertex is at the opposite corner or at one of the opposite edges of the patch.

In this embodiment, a larger patch is considered as being at least partially covered by a primitive 102 when at least one of the smaller patches that are encompassed by the larger patch is determined as being at least partially covered by the primitive 102 using the above conditions.

The patch sub-divider 204 of the rasteriser 200 also determines whether a patch of the render output is completely covered by a primitive 102. In this embodiment, a patch can be determined as being completely covered by a primitive when the patch testing points are all found to be within the edges of the primitive 102.

In this embodiment, a larger patch is considered to be completely covered by a primitive 102 when all of the smaller patches that are encompassed by the larger patch are determined as being completely covered by the primitive 102 using the above condition.

If it is found that a patch is not covered by the primitive 102 at all, then the patch is not processed further in respect of the primitive 102 in question (i.e. the entire patch is discarded for the primitive 102 in question). However, another patch may be selected and tested against the primitive 102. Similarly, the region of the render output covered by the patch may be selected and tested as a new patch against a new input primitive.

If a primitive 102 is found to only partially cover a larger patch, then the larger patch is tested with respect to data stored in the hierarchical ZS buffer(s) 112. According to the outcome of the hierarchical depth and stencil tests performed by the patch sub-divider 204 of the rasteriser 200, the larger patch may then be discarded (if entirely occluded) or sub-divided into its four smaller 8×8 patches, with those smaller patches ("sub-patches") then being forwarded to a first patch buffer 206 to await further individual testing against the primitive 102 on a first-in-first-out (FIFO) basis.

If a primitive 102 is found to completely cover a larger patch, then the larger patch is again tested with respect to data stored in the hierarchical ZS buffer(s) 112. According to the outcome of the hierarchical depth and stencil tests performed by the patch sub-divider 204 of the rasteriser 200, the larger patch may then be discarded (if entirely occluded), or sub-divided into its four smaller 8×8 patches (if the ZS test is inconclusive, such that the primitive may be partly occluded), or forwarded to the first patch buffer 206 to await output from the rasteriser 200 without further sub-division (if the primitive is determined as not being occluded at all).

A smaller 8×8 patch can also be selected from the first patch buffer 206 by the multiplexer 202, passed to the patch sub-divider 204, and then either discarded, or sub-divided into a set of four even smaller 4×4 patches and forwarded to a second patch (FIFO) buffer 208, depending on the results of the tests performed by the patch sub-divider 204.

In this embodiment, at the 8×8 patch level, a patch that is at least partially covered is always sub-divided into a set of four even smaller 4×4 patches, even if the 8×8 patch is completely covered by the primitive in question. This is because the subsequent stage of the graphics processing system is not configured to handle 8×8 patches. However, in other embodiments, the subsequent stage of the graphics processing system may be configured to handle 8×8 patches, and thus in these other embodiments, a completely covered 8×8 patch may not need to be sub-divided into a set of four even smaller 4×4 patches by the patch sub-divider 204.

A completely covered larger 16×16 patch may also be selected from the first patch buffer 206 by the multiplexer 202. However, since that larger patch is already known to be completely covered, and potentially visible, that completely covered larger patch will be passed through the patch sub-divider 204 without testing, and forwarded to the second patch buffer 208.

An even smaller 4×4 patch can also be selected from the second patch buffer 208 by the multiplexer 202, processed again in substantially the same way as a larger patch by the patch sub-divider 204, and then discarded or forwarded to a third patch (FIFO) buffer 210 (this time either with or without sub-division into a set of four smallest 2×2 patches) depending on the results of the tests performed by the patch sub-divider 204.

In this embodiment, the subsequent stage of the graphics processing system is configured to handle 4×4 patches, and thus in this embodiment, a completely covered 4×4 patch need not be sub-divided into a set of four even smaller 2×2 patches by the patch sub-divider 204.

A completely covered 16×16 patch may again also be selected from the second patch buffer 208 by the multiplexer 202. However, as discussed above, since that patch is already known to be completely covered, and potentially visible, that completely covered patch will be passed through the patch sub-divider 204 without testing, and forwarded to the third patch buffer 210.

A smallest 2×2 patch may also be selected from the third patch buffer 210 and processed by fragment generating circuitry of a sample tester 212. To do this, the sample tester 212 tests the individual sampling points of that smallest patch to see which of the sampling points are covered by the primitive 102 and generates fragments for rendering corresponding to, and indicating, the sampling points found to be covered by the primitive 102 (four fragments would be generated if all four of the 2×2 fragments in the minimum size patch are at least partially covered by the primitive 102).

The sample tester 212 can also associate with each fragment a coverage mask in the form of a bitmap that indicates, for each sampling point of the sampling point pattern used to generate the fragment, whether the corresponding sampling point is covered (i.e., in effect, whether the fragment is being used to render that sampling point (i.e. whether its data should be stored for that sampling point)).

The generated fragments are then output from the rasteriser 200 to a ZS-unit 214 that implements the early ZS testing stage 106.

A completely covered 16×16 or 4×4 patch may also be selected from the third patch buffer 210, bypass the sample tester 212 via bypass circuitry, and be output from the rasteriser 200 to the ZS-unit 214. This can help to avoid the output of the rasteriser 200 from becoming blocked, e.g. because the sample tester 212 does not need to generate fragments from those completely covered patches.

Furthermore, the above process of passing the completely covered larger patches through the buffers for the smaller patches has the benefit of maintaining at least a degree of the original rasterisation order for the primitives 102. This may be required or desirable for some forms of graphics processing operations.

In this embodiment, priority is also given to selecting completely covered 16×16 patches at the front of the second patch buffer 208, which is nominally provided for the 4×4 patches, then priority is given to selecting completely covered 16×16 patches at the front of the first patch buffer 206, which is nominally provided for the 8×8 patches. This can help to prevent the second patch buffer 208 becoming full and blocking the rasteriser 200. Priority is then given to selecting larger patches for processing in respect of a new primitive 102, then priority is given to selecting larger partially covered patches at the front of the first patch buffer 206, and then priority is given to selecting smaller partially covered patches at the front of the second patch buffer 208. This can help to create sufficient work or "back pressure" for the rasteriser 200, and thus prevent processing bubbles from forming.

In the present embodiment, a bounding box is generated for each primitive 102 and a larger patch is tested against each primitive 102 that has a bounding box which at least partially covers that larger patch. Once all the primitives 102 have been processed by the rasteriser 200 for the larger patch area, then the rasteriser 200 moves on to the next larger patch area and so on, until all the primitives 102 for the desired output have been processed. Other arrangements are possible.

Any fragments or patches that are output by the rasteriser 200 are then held in an input queue or queues 216 in the ZS-unit 214 to await testing by the ZS-unit 214. Thus, in the present embodiment, the ZS-unit 214 is able to test both fragments and patches. The operation of this ZS-unit 214 will be described in more detail below with reference to FIG. 6.

However, in other embodiments, the ZS-unit 214 may not be able to test whole patches. In these other embodiments, a dedicated patch fragment generating stage 218, which comprises processing circuitry that can generate fragments from patches received from the rasteriser 200 (and pass through any fragments received from the rasteriser 200), may be provided between the rasteriser 200 and the ZS-unit 214. In these other embodiments, the fragment generating stage 218 may not perform any sampling point testing on the completely covered patches (since the patches are already known to be fully covered by a primitive 102) and may therefore directly generate fragments corresponding to all of the sampling points of the patch (and associate with each fragment a coverage mask that indicates complete coverage).

Figure 3:
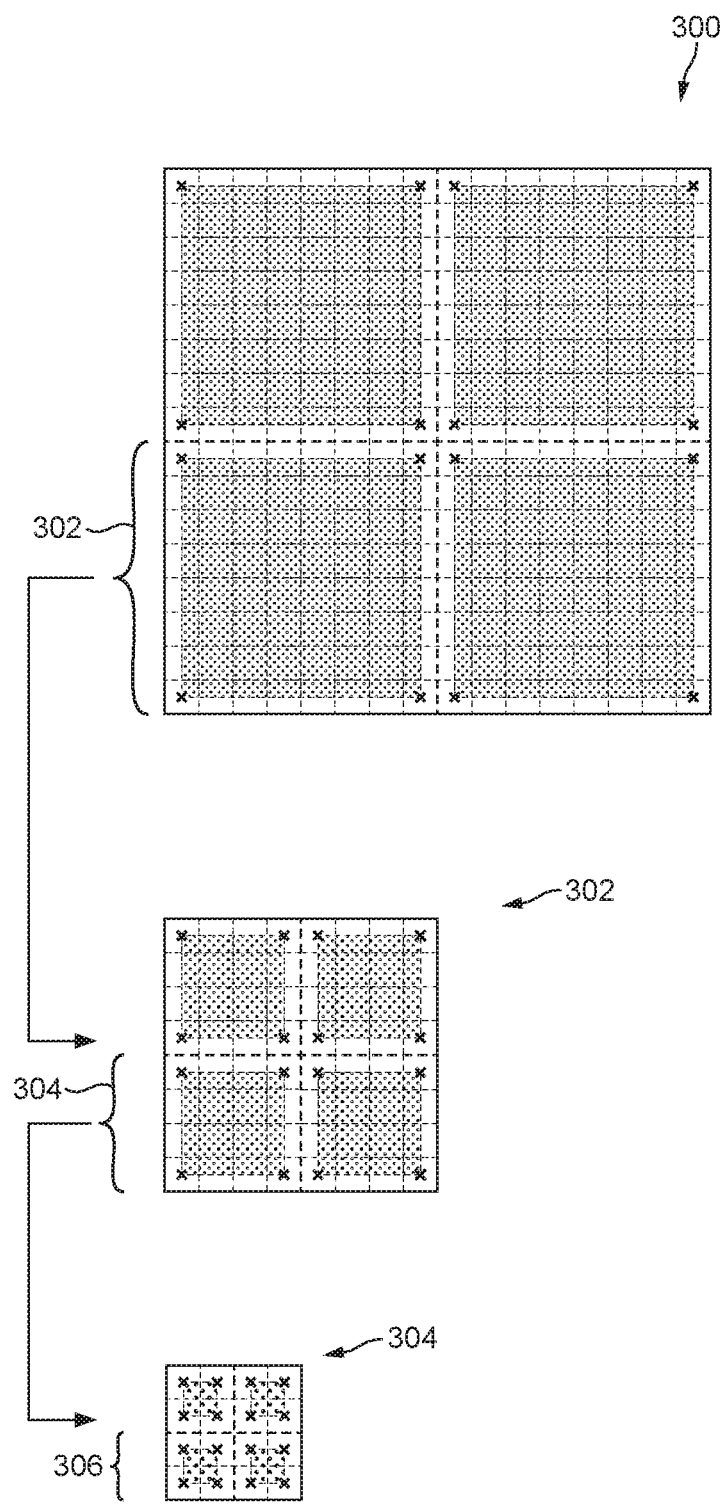
FIG. 3 illustrates a hierarchy of patches that can be used in embodiments of the technology described herein.

FIG. 3 illustrates a hierarchy of patches that can be used in the present embodiments. FIG. 3 shows the largest 16×16 fragment patch 300, which can be sub-divided into four smaller 8×8 fragment patches 302, which can each be further sub-divided into four even smaller 4×4 fragment patches 304, which can each be even further sub-divided into four of the smallest 2×2 fragment patches 306.

Also shown in FIG. 3, with "x"s, are 16 patch testing points for each of the larger patches (i.e. 4 patch testing points for each of the 4 smaller patches encompassed by that larger patch). These are the testing points considered by the patch sub-divider 204 when performing primitive coverage and hierarchical ZS tests in respect of a patch.

Also shown in FIG. 3, with shading, is the area of the larger patch 300 that is actually being tested for coverage by a primitive at that level of the patch hierarchy. As is shown in FIG. 3, there is an unshaded margin around each smaller patch 302 being tested for the larger patch 300, meaning that not all of the larger patch 300 is tested for coverage by a primitive. However, this is considered acceptable, and indeed desirable, since small primitives that fall entirely within those margins would not cover any of the sampling points and thus would not generate fragments anyway.

Figure 4:
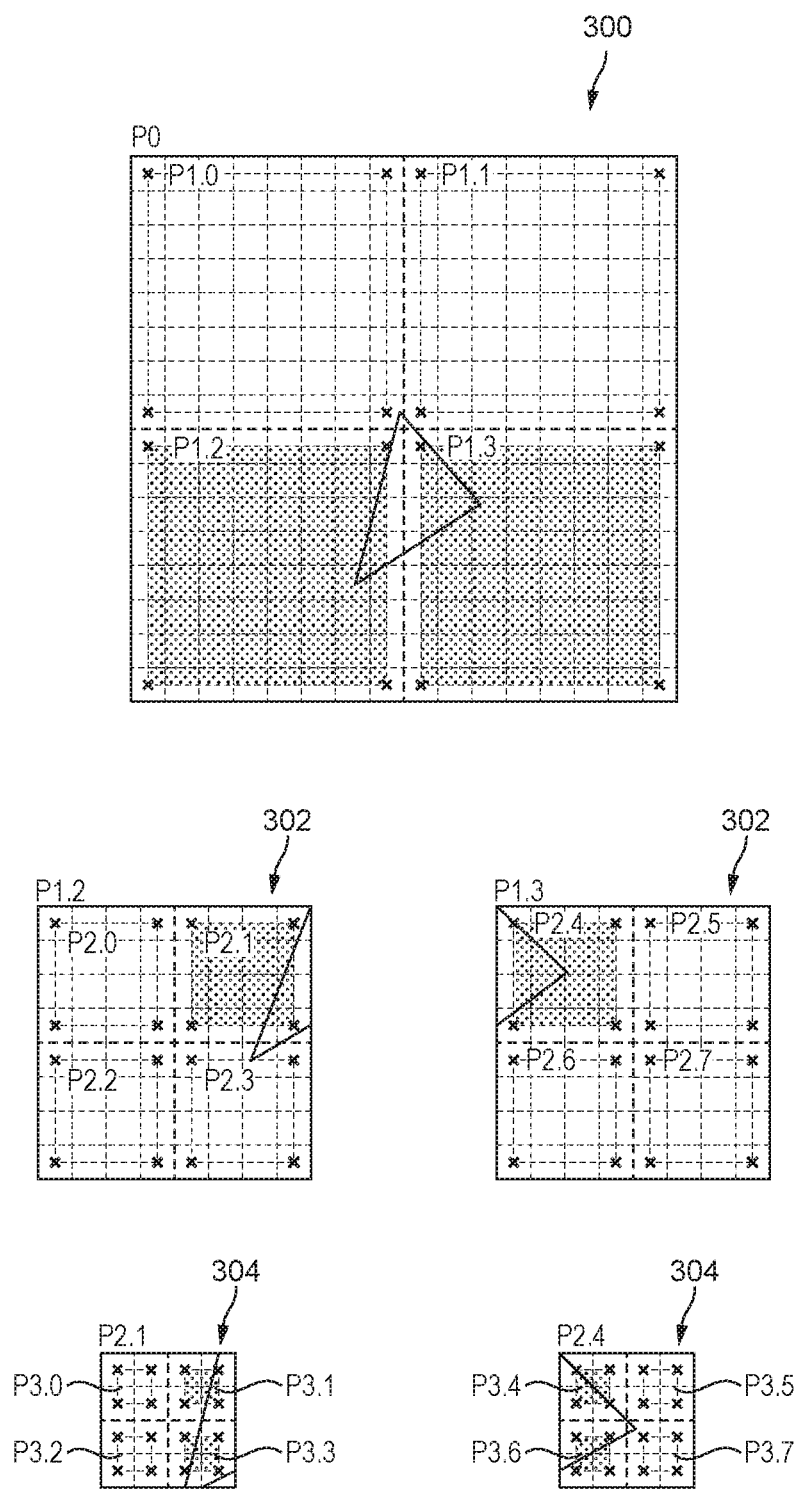
FIG. 4 illustrates of process of testing whether a patch is at least partially covered by a primitive that can be used in embodiments of the technology described herein.

FIG. 4 illustrates the hierarchical testing and sub-division process performed by the patch sub-divider 204 in respect of a primitive 400.

FIG. 4 initially shows the primitive 400 to be processed in respect of a largest 16×16 patch 300, labelled here as patch P0. As is shown in FIG. 4, the primitive 400 does not completely cover the patch P0. The primitive 400 does, however, at least partially cover the patch P0. Thus, the patch P0 will be sub-divided by the patch sub-divider 204 into four smaller 8×8 patches 302, labelled here as P1.0, P1.1, P1.2 and P1.3.

It is also determined by the patch sub-divider 204 that the primitive 400 does not at least partially cover the patches P1.0 and P1.1. Patches P1.0 and P1.1 can therefore be discarded from further processing in respect of the primitive 400. The primitive 400 does, however, at least partially cover the patches P1.2 and P1.3. Patches P1.2 and P1.3 will therefore be processed further in respect of the primitive 400.

As is then shown in FIG. 4, the primitive 400 does not completely cover either of the patches P1.2 and P1.3. The primitive 400 does, however, at least partially cover the patches P1.2 and P1.3. Thus, the patches P1.2 and P1.3 will both be sub-divided by the patch sub-divider 204 into respective sets of four smaller 4×4 patches 304, labelled here as P2.0, P2.1, P2.2 and P2.3 for the patch P1.2 and as P2.4, P2.5, P2.6 and P2.7 for the patch P1.3.

It is also determined by the patch sub-divider 204 that the primitive 400 does not at least partially cover the patches P2.0, P2.2 and P2.3 for the patch P1.2 or the patches P2.5, P2.6 and P2.7 for the patch P1.3. Those patches can therefore be discarded from further processing in respect of the primitive 400. The primitive 400 does, however, at least partially cover patches P2.1 and P2.4. Patches P2.1 and P2.4 will therefore be processed further in respect of the primitive 400.

As is then shown in FIG. 4, the primitive 400 does not completely cover either of the patches P2.1 and P2.4. The primitive 400 does, however, at least partially cover the patches P2.1 and P2.4. Thus, the patches P2.1 and P2.4 will both be sub-divided by the patch sub-divider 204 into respective sets of smaller 2×2 patches, labelled here as P3.0, P3.1, P3.2 and P3.3 for the patch P2.1 and as P3.4, P3.5, P3.6 and P3.7 for the patch P2.4.

It is also determined by the patch sub-divider 204 that the primitive 400 does not at least partially cover the patches P3.0 and P3.2 for the patch P2.1 or the patches P3.5 and P3.7 for the patch P2.4. Those patches can therefore be discarded from further processing in respect of the primitive 400. The primitive 400 does, however, at least partially cover patches P3.1, P3.3, P3.4 and P3.6. Patches P3.1, P3.3, P3.4 and P3.6 will therefore be processed further in respect of the primitive 400.

In particular, patches P3.1, P3.3, P3.4 and P3.6 can then each be sample tested by the sample tester 212 to determine which fragments to generate for those patches. This is dependent on which sampling points for the fragments corresponding to that patch are covered by the primitive 400. For example, the patch P3.1 will generate one lower-right fragment, because the sampling point corresponding to that lower-right fragment is covered by the primitive 400, etc.

Figure 5:
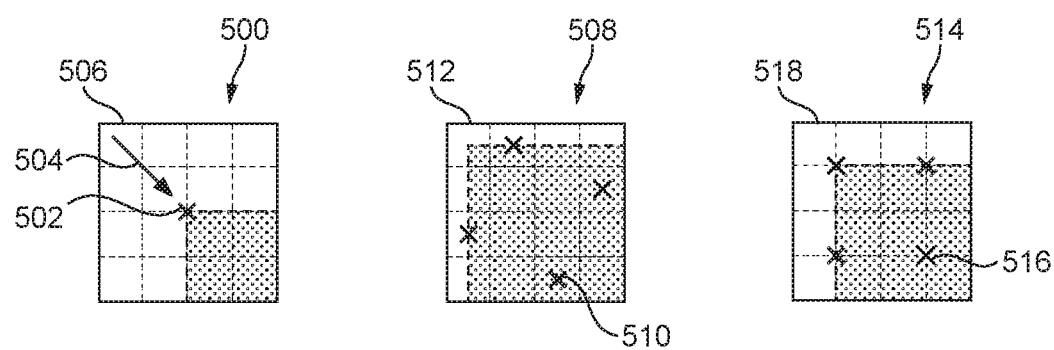
FIG. 5 shows sampling point patterns for fragments that can be used in embodiments of the technology described herein.

In FIG. 4, one sampling point is used to test each fragment and thus the fragments are tested in single-sampled mode. FIG. 5 illustrates this, but also illustrates alternative sampling point patterns that may be used in multi-sampled mode in embodiments of the technology described herein.

As is shown in FIG. 5, in the single-sampled mode, a region 500 being sampled for a fragment may have a single sampling point 502 applied at an offset 504 from a (x,y) position 506 for the fragment. As is also shown in FIG. 5, in the multi-sampled mode, a region 508 being sampled for a fragment may have four sampling points 510 applied at respective offsets from a (x,y) position 512 for the fragment to form a rotated grid of sampling points. Alternatively, in the multi-sampled mode, a region 514 being sampled for a fragment may have four sampling points 516 applied at respective offsets from a (x,y) position 518 for the fragment 514 to form an ordered grid of sampling points.

One or more of the sampling points of FIG. 5 can also be used as patch testing points. For example, the sampling points of each corner fragment of each smaller patch may be used as the patch testing points for the larger patch that encompasses those smaller patches. FIG. 5 accordingly also shows, with shading, the area that such sampling points would encompass if those sampling points were to be used as patch testing points for the upper-left fragment of a patch. As is shown, a rotated grid of patch testing points covers a greater patch area, and thus may capture more primitives, but at the expense of increased processing required to process those patch testing points and primitives. On the other hand, a single patch testing point covers a smaller patch area, and thus may lead to more primitives being culled since they are now outside of that smaller patch area, but with the benefit of reduced processing needed to process fewer patch testing points and primitives.

Other sampling point and patch testing point arrangements are, of course, possible, such as 8× and 16× sampling patterns, etc.

Referring again to FIG. 1, each fragment or patch issued (output) by the rasteriser 200 is then subjected to an early depth and stencil test at the early ZS testing stage 106.

Figure 6:
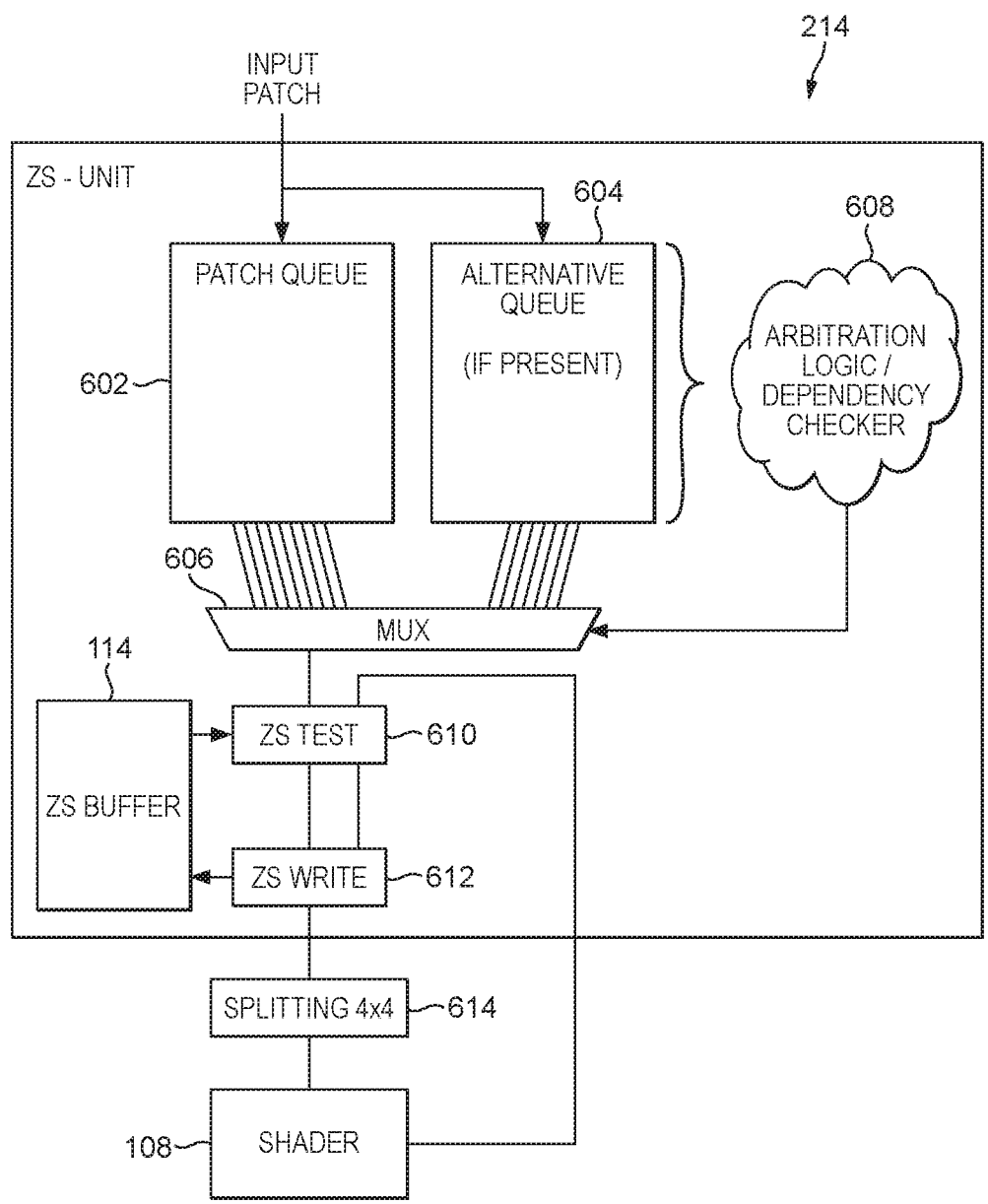
FIG. 6 shows schematically and in more detail an early depth and stencil unit of a graphics processing system that can be operated in accordance with the technology described herein.

FIG. 6 shows a ZS-unit 214 for the early ZS testing stage 106 in more detail. As discussed above, in this embodiment, the ZS-unit 214 can only process, and thus the rasteriser 200 will only output, the largest 16×16 patches, the smaller 4×4 patches, and fragments. However, in other embodiments, other sized patches may be handled by the ZS-unit 214.

In this embodiment, the ZS-unit 214 comprises a patch queue buffer 602 that receives and stores the smaller 4×4 patches and fragments to be processed and an alternative patch queue buffer 604 that receives and stores the largest 16×16 patches to be processed. However, in other embodiments, a single queue buffer may be used.

In this embodiment, the ZS-unit 214 comprises control circuitry 608 that selects, using a multiplexer 606, a patch or fragment for depth and stencil testing. In this embodiment, older patches or fragments received by the ZS-unit 214 are selected for depth testing by the control circuitry 608 before newer patches or fragments received by the ZS-unit 214.

In this regard, the oldest patch or fragment for a particular position is the patch or fragment at that particular position that was input into the queues first (i.e. the longest time ago). A patch or fragment that is considered to be the oldest item for a particular position will only cease to be considered as the oldest item for that particular position when a depth test is no longer needed (e.g. when a depth test is performed) in respect of that patch or fragment for that particular position.

In some cases, in which depth testing is deferred until after shading, a patch or fragment may not be subjected to an early depth test for a particular position. In these cases, the patch or fragment in question may be subjected to a late depth test for that particular position and may only cease to be considered as the oldest item for that particular position when that late depth test is performed. This can mean that a newer patch or fragment received by the ZS-unit 214 may have to wait for, and is dependent on, the late depth test to be performed on the older shaded fragment for the particular position. In this embodiment, the control circuitry 608 is configured to keep track of the positions of such dependencies and to select patches or fragments for depth testing at positions that do not have such dependencies, or for which such a dependency has been resolved, e.g. by a late depth test being performed.

In this embodiment, the ZS-unit 214 can test up to 16 sampling points in parallel. Thus, in 4× multi-sampled mode, a group of 2×2 fragments will be tested in parallel (since those fragments comprise 2×2×4=16 sampling points). Similarly, in single-sampled mode, a smaller 4×4 patch can be tested as a whole (since that patch also comprises 4×4×1=16 sampling points). Thus, in 4× multi-sampled mode, groups of 2×2 fragments are extracted by the control circuitry 608 from a larger 16×16 patch or smaller 4×4 patch. However, in single-sampled mode, a smaller 4×4 can be selected and tested as it is. Similarly, in single-sampled mode, 4×4 patches may be extracted by the control circuitry 608 from a larger 16×16 patch. Other arrangements for selecting or extracting patches (e.g. other selected or extracted patch sizes) are possible where a greater or lesser number of sampling points than 16 sampling points can be tested in parallel and/or where other sampling point patterns (e.g. 8× or 16×) are used.

As will be appreciated, since there are fewer sampling positions corresponding to smaller patches and fragments when compared with larger patches, there is a lower chance of there being unresolved dependencies for smaller patches and fragments when compared with larger patches. In this embodiment, the control circuitry 608 does not need to wait for a larger patch to be the oldest item at every position before extracting a smaller patch or fragment from that larger patch for depth testing. Thus, in this embodiment, by being able to extract smaller patches or fragments from a larger patch for depth testing in this way, the ZS-unit 214 is less likely to have to stall in order to wait for dependencies to be resolved.

To assist the extraction process, an extraction bitmap may be provided for a larger patch that indicates which smaller patches or fragments have been extracted and tested so far for that larger patch. To limit the number of bitmaps required, the ZS-unit 214 may store a first larger patch that is being tested, and thus has an associated extraction bitmap, and a second larger patch that is not yet able to be tested, and thus does not have an associated extraction bitmap. Once testing of the first larger patch is complete, the extraction bitmap can be reset and associated with the second larger patch, and so on.

Other arrangements for tracking which patches or fragments have been extracted and tested so far may be used as desired. For example, in some embodiments, a respective extraction bitmap may be provided for each (and e.g. every) one of two or more (plural) larger patches stored in the queue buffer. These embodiments can further help to reduce the chance of the ZS-unit 214 stalling, since there is no need for the control circuitry 608 to wait for the entire older patch to be depth tested before selecting a smaller patch or fragment from a newer larger patch. Instead, if they are dependency-free, one or more smaller patches or fragments may be selected for depth testing from a newer larger patch, rather than from just an older larger patch, and the extraction bitmap for the newer larger patch can be updated accordingly by the control circuitry 608 so as to keep track of extractions.

Depth data for the selected patch or fragment is then depth tested by a ZS test unit 610 against depth data stored in the ZS buffers 114. Fragments or patches that fail the early depth and stencil test are culled by the ZS-unit 214 at the early ZS testing stage 106, whereas fragments or patches that pass the early depth and stencil test are output from the ZS-unit 214. In this regard, the early ZS testing stage 106 is configured to operate in an appropriately conservative manner. The depth data stored in the ZS buffers 114 is also updated, if appropriate, by a ZS write unit 612.

Finally, any single-sampled 4×4 patches output from the ZS-unit 214 are used to generate fragments by a patch splitting unit 614. In a similar manner to the optional fragment generating stage 218 discussed above, the patch splitting unit 614 comprises fragment generating circuitry that can generate graphics fragments from patches processed by the ZS-unit 214 (and pass through any fragments processed by the ZS-unit 214). In this regard, for a completely covered patch that entirely passes the depth and stencil testing, the patch splitting unit 614 may not perform any sampling point testing on that patch (since the patch is already known to be completely covered by the primitive 102) and may therefore directly generate all of the fragments for rendering that correspond to the patch (and associate with each fragment a completely covered coverage mask). However, for a completely covered patch that only partially passes the depth and stencil testing, the patch splitting unit 614 may only generate some of the fragments for rendering that correspond to that patch (and associate with each fragment an appropriately covered coverage mask) based on the result of the depth and stencil testing.

Referring again to FIG. 1, fragments are then sent onwards to the fragment shading stage 108 (the renderer). The fragment shading stage 108 performs the appropriate fragment processing (rendering) operations on the fragments it receives, so as to process the fragments to generate the appropriate fragment data, etc., for the render output (e.g. for display of the fragments).

This fragment processing may include any suitable and desired fragment shading processes, such as executing fragment shader programs on the fragments, applying textures to the fragments, applying blending, fogging or other operations to the fragments, etc., to generate the appropriate fragment data. In the present embodiment, the fragment shading stage 108 is in the form of a shader pipeline (a programmable fragment shader), but other arrangements, such as the use also or instead of fixed function fragment shading units would be possible, if desired.

There is then a "late" fragment depth and stencil (ZS) test stage 110 (in this embodiment also implemented by the ZS-unit 214) which (if it is to be performed, e.g. where early depth and stencil testing for a fragment has not taken place before shading) carries out, inter alia, the end of pipeline depth test on the shaded fragments (on the covered sampling points associated with shaded fragments) to determine whether the sampling points that a rendered fragment represents will overdraw the fragments whose values are currently stored in the ZS buffers 114 (i.e. determines whether the fragment data for the fragments issuing from the fragment shading stage 108 should be stored in the tile buffers 116 (should replace or modify the fragment data in the tile buffer(s) of the fragments that have already been rendered)).

To do this, the late ZS test stage 110 compares the depth values of (associated with) the fragments issued from the fragment shading stage 108 with the (per-sampling position) depth values stored in the ZS buffers 114 for the sampling points in question. The depth values for sampling points that pass the late depth test are also written appropriately to the ZS buffer 114 to update it.

This late ZS test stage 110 also carries out any necessary "late" alpha and/or stencil tests on the fragments. In this embodiment, the early ZS testing stage 106 and late ZS test stage 110 are performed by a single ZS-unit 214 as shown in FIG. 6, but they may be configured as distinct ZS-units in other embodiments. Alternatively, any necessary "late" alpha and/or stencil tests may be performed by the fragment shading stage 108.

The fragments that pass the late fragment ZS test are then subjected to any remaining operations necessary on the fragments, such as blending with the framebuffer, dither etc. (not shown).

Finally, the output fragment data values are written to appropriate tile buffers 116 that store, an appropriate, e.g. colour, value for each sampling point that the buffers represent (in essence for each sampling point of the tile that is being processed).

Once each tile has been processed, its data is, e.g., exported from the tile buffers 116 to a main memory (e.g. to a frame buffer in a main memory) (not shown) for storage, and the next tile is then processed, and so on, until sufficient tiles have been processed to generate the entire render output (e.g. frame (image) to be displayed).

Other arrangements for the fragment processing pipeline would, of course, be possible.

It can be seen from the above that embodiments of the technology described herein can provide efficient, hierarchal, processing of primitives, whilst helping to prevent the output of the rasteriser from becoming blocked. This is achieved in embodiments of the technology described herein by testing a larger patch against a primitive to be processed to determine if the primitive covers the larger patch. When it is determined that the primitive only partially covers the larger patch, the larger patch is sub-divided into plural smaller patches and at least one of the smaller patches is re-tested against the primitive. Conversely, when it is determined that the primitive completely covers the larger patch, the larger patch is output from the rasteriser in respect of the primitive for processing by a subsequent stage of the graphics processing system.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of processing a primitive when generating a render output in a graphics processing system in which, for the purposes of generating the render output, the render output is divided into a plurality of larger patches, each larger patch encompassing a set of plural smaller patches of the render output, the method comprising:
performing, by a rasteriser of the graphics processing system, the steps of:
testing a larger patch of the render output against a primitive to be processed to determine if the primitive to be processed at least partially covers the larger patch of the render output;
when it is determined that the primitive only partially covers the larger patch of the render output, sub-dividing the larger patch into a set of plural smaller patches of the render output and testing at least one of the smaller patches of the render output against the primitive to be processed to determine if the primitive to be processed at least partially covers the at least one smaller patch of the render output; and
when it is determined that the primitive completely covers the larger patch of the render output, outputting the larger patch in respect of the primitive from the rasteriser for processing by a subsequent stage of the graphics processing system without the rasteriser generating a set of graphics fragments for the larger patch in respect of the primitive;
the method further comprising:
when it is determined that the primitive completely covers the larger patch of the render output, processing by a subsequent stage of the graphics processing system, the larger patch output by the rasteriser in respect of the primitive without the rasteriser generating a set of graphics fragments for the larger patch in respect of the primitive.

2. The method of claim 1 comprising:
when it is determined that the primitive completely covers the larger patch of the render output, outputting the larger patch in respect of the primitive from the rasteriser without the rasteriser determining which sampling point positions for a set of graphics fragments corresponding to the larger patch are covered by the primitive to be processed.

3. The method of claim 1 comprising:
when it is determined that the primitive completely covers the larger patch of the render output, outputting the larger patch in respect of the primitive from the rasteriser without the rasteriser sub-dividing the larger patch into a set of plural smaller patches.

4. The method of claim 1, comprising
when it is determined that the primitive completely covers the larger patch of the render output:
buffering the larger patch in a buffer of the rasteriser;
selecting the larger patch from the buffer and passing the larger patch through patch sub-divider circuitry of the rasteriser; and
re-buffering the larger patch in a buffer of the rasteriser and/or outputting the larger patch from the rasteriser.

5. The method of claim 1, comprising:
when it is determined that the primitive only partially covers a smaller patch of the render output, sub-dividing the smaller patch into a set of plural even smaller patches of the render output and testing at least one of the even smaller patches of the render output against the primitive to be processed to determine if the primitive to be processed at least partially covers the at least one even smaller patch of the render output; and when it is determined that the primitive completely covers the smaller patch of the render output, outputting the smaller patch in respect of the primitive from the rasteriser for processing by a subsequent stage of the graphics processing system.

6. The method of claim 1, wherein:

the subsequent stage of the graphics processing system comprises a patch depth and/or stencil testing stage, the method comprising the patch depth and/or stencil testing stage performing one or more depth and/or stencil tests for the larger patch in respect of the primitive.

7. The method of claim 6, wherein:

the patch depth and/or stencil testing stage comprises processing circuitry configured to test plural sampling points for one or more graphics fragments substantially simultaneously, the method further comprising the processing circuitry of the patch depth and/or stencil testing stage testing plural sampling points for the larger patch substantially simultaneously.

8. A method of depth and/or stencil testing when generating a render output in a graphics processing system in which, for the purposes of generating the render output, the render output is divided into a plurality of larger patches, each larger patch encompassing a set of plural smaller patches of the render output, the method comprising:

performing, by a patch depth and/or stencil testing stage of the graphics processing system subsequent to a rasterization stage of the graphics processing system, the steps of:

receiving a larger patch in respect of a primitive, wherein no graphics fragments were generated for the larger patch in respect of the primitive in the rasterization stage; and performing one or more depth and/or stencil tests for the larger patch in respect of the primitive.

9. A graphics processing system in which, for the purposes of generating a render output, the render output is divided into a plurality of larger patches, each larger patch encompassing a set of plural smaller patches of the render output, the graphics processing system comprising a rasterisation circuit configured to:

test a larger patch of the render output against a primitive to be processed to determine if the primitive to be processed at least partially covers the larger patch of the render output; and when it is determined that the primitive only partially covers the larger patch of the render output, sub-divide the larger patch into a set of plural smaller patches of the render output and test at least one of the smaller patches of the render output against the primitive to be processed to determine if the primitive to be processed at least partially covers the at least one smaller patch of the render output; and when it is determined that the primitive completely covers the larger patch of the render output, output the larger patch in respect of the primitive from the rasterisation circuit for processing by a subsequent stage of the graphics processing system without the rasterisation circuit generating a set of graphics fragments for the larger patch in respect of the primitive; and the graphics processing system further comprises a subsequent processing circuit configured to, when it is determined that the primitive completely covers the larger patch of the render output, process the larger patch output by the rasterisation circuit in respect of the primitive without the rasterisation circuit generating a set of graphics fragments for the larger patch in respect of the primitive.

10. The system of claim 9, wherein:

the rasterisation circuit further comprises a sample testing circuit configured to determine which sampling point positions for a set of graphics fragments corresponding to a patch are covered by a primitive to be processed; and the rasterisation circuit is configured to, when it is determined that the primitive completely covers the larger patch of the render output, output the larger patch in respect of the primitive from the rasterisation circuit without the sample testing circuit determining which sampling point positions for a set of graphics fragments corresponding to the larger patch are covered by the primitive to be processed.

11. The system of claim 9, wherein:

the rasterisation circuit is configured to, when it is determined that the primitive completely covers the larger patch of the render output, output the larger patch in respect of the primitive from the rasterisation circuit without the rasterisation circuit sub-dividing the larger patch into a set of plural smaller patches.

12. The system of claim 9, wherein:

the rasterisation circuit further comprises one or more buffers for storing patches; and the rasterisation circuit is configured to, when it is determined that the primitive completely covers the larger patch of the render output:

buffer the larger patch in a buffer of the rasterisation circuit;

select the larger patch from the buffer and pass the larger patch through patch sub-divider circuitry of the rasterisation circuit; and re-buffer the larger patch in a buffer of the rasterisation circuit and/or output the larger patch from the rasterisation circuit.

13. The system of claim 9, wherein:

the rasterisation circuit is configured to, when it is determined that the primitive only partially covers a smaller patch of the render output, sub-divide the smaller patch into a set of plural even smaller patches of the render output and test at least one of the even smaller patches of the render output against the primitive to be processed to determine if the primitive to be processed at least partially covers the at least one even smaller patch of the render output; and the rasterisation circuit is configured to, when it is determined that the primitive completely covers the smaller patch of the render output, output the smaller patch in respect of the primitive from the rasterisation circuit for processing by a subsequent stage of the graphics processing system.

14. The system of claim 9, wherein:

the subsequent stage of the graphics processing system comprises patch fragment generating circuitry, the patch fragment generating circuitry being configured to generate a set of graphics fragments from the larger patch in respect of the primitive.

15. The system of claim 9, wherein:

the subsequent stage of the graphics processing system comprises a patch depth and/or stencil testing stage, the patch depth and/or stencil testing stage being configured to perform one or more depth and/or stencil tests for the larger patch in respect of the primitive.

16. The system of claim 15, wherein:

the patch depth and/or stencil testing stage comprises processing circuitry configured to test plural sampling points for one or more graphics fragments substantially simultaneously, the processing circuitry of the patch depth and/or stencil testing stage being further configured to test plural sampling points for the larger patch substantially simultaneously.

17. The system of claim 15, wherein the patch depth and/or stencil testing stage is configured to extract plural smaller patches and/or graphics fragments for depth and/or stencil testing from the larger patch.

18. A non-transitory computer readable storage medium storing software code which when executing on a processor performs a method of processing a primitive when generating a render output in a graphics processing system in which, for the purposes of generating the render output, the render output is divided into a plurality of larger patches, each larger patch encompassing a set of plural smaller patches of the render output, the method comprising:

performing, by a rasteriser of the graphics processing system, the steps of:

testing a larger patch of the render output against a primitive to be processed to determine if the primitive to be processed at least partially covers the larger patch of the render output;

when it is determined that the primitive only partially covers the larger patch of the render output, subdividing the larger patch into a set of plural smaller patches of the render output and testing at least one of the smaller patches of the render output against the primitive to be processed to determine if the primitive to be processed at least partially covers the at least one smaller patch of the render output; and when it is determined that the primitive completely covers the larger patch of the render output, outputting the larger patch in respect of the primitive from the rasteriser for processing by a subsequent stage of the graphics processing system without the rasteriser generating a set of graphics fragments for the larger patch in respect of the primitive;

the method further comprising:

when it is determined that the primitive completely covers the larger patch of the render output, processing by a subsequent stage of the graphics processing system, the larger patch output by the rasteriser in respect of the primitive without the rasteriser generating a set of graphics fragments for the larger patch in respect of the primitive.

* * * * *